United States Patent
Rangasamy et al.

(10) Patent No.: US 11,228,573 B1
(45) Date of Patent: Jan. 18, 2022

(54) APPLICATION PROGRAMMING INTERFACE EXCHANGE

(71) Applicant: Equinix, Inc., Redwood City, CA (US)

(72) Inventors: Venkatachalam Rangasamy, San Jose, CA (US); Muhammad Durrani, San Jose, CA (US); Ashwin Kamath, Sunnyvale, CA (US)

(73) Assignee: Equinix, Inc., Redwood City, CA (US)

( * ) Notice: Subject to any disclaimer, the term of this patent is extended or adjusted under 35 U.S.C. 154(b) by 777 days.

(21) Appl. No.: 15/917,203

(22) Filed: Mar. 9, 2018

(51) Int. Cl.
| | |
|---|---|
| *H04L 29/06* | (2006.01) |
| *G06F 9/54* | (2006.01) |
| *H04L 29/08* | (2006.01) |
| *G06F 21/62* | (2013.01) |
| *H04L 9/08* | (2006.01) |
| *H04L 9/32* | (2006.01) |
| *H04L 12/46* | (2006.01) |

(52) U.S. Cl.
CPC .............. *H04L 63/067* (2013.01); *G06F 9/54* (2013.01); *G06F 21/629* (2013.01); *H04L 9/0861* (2013.01); *H04L 9/3228* (2013.01); *H04L 12/4641* (2013.01); *H04L 67/32* (2013.01)

(58) Field of Classification Search
CPC ... H04L 63/067; H04L 9/0861; H04L 9/3228; H04L 12/4641; H04L 67/32; G06F 9/54; G06F 21/629
USPC .......................................................... 726/4
See application file for complete search history.

(56) References Cited

U.S. PATENT DOCUMENTS

| | | | |
|---|---|---|---|
| 8,537,845 | B2 | 9/2013 | Waldrop et al. |
| 9,886,267 | B2* | 2/2018 | Maheshwari .............. G06F 8/70 |
| 9,948,522 | B2 | 4/2018 | Marinelli et al. |
| 10,372,518 | B2* | 8/2019 | O'Kennedy .......... H04L 63/062 |
| 10,461,959 | B2* | 10/2019 | Bagepalli ............. H04L 12/6418 |
| 2002/0059425 | A1* | 5/2002 | Belfiore .................... G06F 9/54 709/226 |
| 2008/0209451 | A1* | 8/2008 | Michels .................... G06F 9/54 719/328 |
| 2016/0088092 | A1* | 3/2016 | Cardona-Gonzalez ...................... H04W 4/60 709/227 |
| 2016/0337473 | A1* | 11/2016 | Rao ......................... H04L 49/10 |
| 2017/0063614 | A1* | 3/2017 | Hartwig .............. H04L 41/0886 |
| 2017/0223117 | A1* | 8/2017 | Messerli ............. H04L 12/4641 |

(Continued)

OTHER PUBLICATIONS

Rosen et al., "BGP/MPLS IP Virtual Private Networks (VPNs)," RFC 4364, Network Working Group, Feb. 2006, 47 pp.

*Primary Examiner* — Dereena T Cattungal
(74) *Attorney, Agent, or Firm* — Shumaker & Sieffert, P.A.

(57) ABSTRACT

An Application Programming Interface (API) exchange located within a data center is configured to receive, from a customer, a request for access to one or more APIs corresponding to respective service provider networks and to which the API exchange provides access. Based on the request for access, the API exchange bundles the one or more APIs into an API bundle, generates a unique subscription key for accessing the API bundle, and sends the unique subscription key to the customer. The API exchange receives, from the customer, a service request for invoking a requested API of the API bundle, the service request including the unique subscription key. Upon authorizing the service request to access the API bundle based on the unique subscription key, the API exchange sends the service request (Continued)

to the service provider network corresponding to the requested API.

20 Claims, 10 Drawing Sheets

(56) References Cited

U.S. PATENT DOCUMENTS

| | | |
|---|---|---|
| 2018/0054420 A1* | 2/2018 | Mindte .................. H04L 63/068 |
| 2018/0341762 A1* | 11/2018 | Gravenites .......... H04L 63/0807 |
| 2019/0129764 A1* | 5/2019 | Johnson .................. G06N 20/00 |
| 2019/0253274 A1* | 8/2019 | Van Dussen ............ H04L 43/12 |

* cited by examiner

APPLICATION PROGRAMMING INTERFACE EXCHANGE

TECHNICAL FIELD

The disclosure relates to computer networks and, more specifically, to an Application Programming Interface (API) exchange for accessing services provided by service provider networks.

BACKGROUND

As digital services become more dominant, such services interact in an automated way to provide connectivity among enterprises. Productized Application Programming Interfaces (APIs) for accessing enterprise services are becoming the new digital storefront, and enterprises commonly deploy API gateways, accessible to the public Internet, to provide a single, controlled, and reliable point of entry to their internal system architectures.

SUMMARY

In general, this disclosure describes techniques for creating bundles of Application Programming Interfaces (API) provided by respective cloud service providers and mediating access to the bundles of APIs by customers. For example, an exchange provider may deploy an API exchange that provides private network connectivity for customers to multiple service provider networks having private connectivity to the API exchange. The API exchange may obtain application programming interface (API) data describing APIs for services provided by the service providers and accessible to the customers via the API exchange using service requests to the APIs. Such services may include, for example, data storage, eCommerce, billing, marketing, customer relationship management (CRM), social media, digital media, financial, weather, search, and other services accessible using machine-to-machine communication over a network.

A customer of the API exchange may request access to a particular group or "API bundle" of APIs from all of the APIs made available by the API exchange so as to access the services provided by service providers. The API exchange may generate a unique subscription key for the API bundle and send the unique subscription key to the customer for use in accessing the API bundle. Subsequently, customer devices may send a service request to the API exchange, the service request invoking a requested API of the API bundle and also including the unique subscription key. Using the unique subscription key, the API exchange may authorize the customer and service request for accessing the requested API. The API exchange may responsively send, via a private connection, the service request to the service provider network that provides the service corresponding to the requested API.

In some examples, the API exchange provisions a connection to the customer network for accessing the API bundle requested by the customer. The connection may be a virtual circuit, such as a virtual LAN, that is specific to the customer. In response to receiving a service request on the virtual circuit, the API exchange can use the identity of the virtual circuit to identify the API bundle having the API invoked by the service request and validate the service request using the unique subscription key included in the service request.

In some examples, the API exchange may have connectivity with a cloud exchange or other network services exchange that enables one-to-many connectivity between the API exchange and the service provider networks that host the services.

The API exchange techniques described herein may have one or more technical advantages. For example, bundling APIs into API bundles and providing unique subscription keys to customers for accessing such API bundles may enable the customers to access all of the APIs in a API bundle using the same subscription key. This may not only reduce the key management burden on the customer, it may also provide the API exchange provider that mediates access to the APIs with a simple mechanism for validating service requests to APIs.

As additional examples of the technical advantages, the API exchange may allow multiple applications to consume API feed data without requiring any dedicated, direct network-layer connectivity between each of the networks that expose the APIs with one another. In this way, the API exchange may replace interconnected networks such that cloud networks may remain unconnected with one another other, except via the API exchange and only for API traffic. This may avoid a need for customers to purchase or otherwise establish direct or virtual connectivity among customers using cross-connects or virtual connections such as virtual private networks or virtual circuits of a cloud exchange, Internet exchange, or Ethernet exchange. Reducing or eliminating direct or virtual connectivity among customers may simplify the configuration of and reduce a load upon networks by reducing resources and/or resource utilization typically needed to facilitate such network connectivity, such as network links, firewalls, memory resources of network devices, and so forth. The API gateway may also provide a centralized location for multiple API endpoints to perform endpoint-specific (or at least customer-specific) requester verification, security and packet inspection, policy enforcement at the API level, data collection and analytics. Furthermore, the API exchange may provide a virtual circuit or virtual LAN (VLAN) to a customer for accessing the one or more APIs, such that the customer may privately access the APIs without needing to access the Internet or send public traffic over the Internet.

In one example of the techniques of the disclosure, a method including: receiving, by an Application Programming Interface (API) exchange located within a data center and from a customer of the API exchange, a request for access to one or more APIs of a plurality of APIs corresponding to respective service provider networks and to which the API exchange provides access; bundling, by the API exchange and based on the request for access, the one or more APIs into an API bundle; generating, by the API exchange and based on the request, a unique subscription key for accessing the API bundle; sending, by the API exchange and to the customer, the unique subscription key; receiving, by the API exchange and from the customer, a service request for invoking a requested API of the one or more APIs of the API bundle, the service request including the unique subscription key for accessing the API bundle; and upon authorizing the service request to access the API bundle based on the unique subscription key, sending, by the API exchange, the service request to the service provider network corresponding to the requested API.

In another example of the techniques of the disclosure, an Application Programming Interface (API) exchange located within a data center, including: a network; a computing system including one or more processors, wherein the computing system is configured to receive, from a customer of the API exchange and via the network, a request for access to one or more APIs of a plurality of APIs corresponding to respective service provider networks and to which the API exchange provides access, wherein the computing system is configured to bundle, based on the request for access, the one or more APIs into an API bundle, wherein the computing system is configured to generate, based on the request, a unique subscription key for accessing the API bundle, wherein the computing system is configured to send, to the customer, the unique subscription key, wherein the computing system is configured to receive, from the customer, a service request for invoking a requested API of the one or more APIs of the API bundle, the service request including the unique subscription key for accessing the API bundle, and wherein the computing system is configured to, upon authorizing the service request to access the API bundle based on the unique subscription key, send the service request to the service provider network corresponding to the requested API.

In another example of the techniques of the disclosure, a non-transitory, computer-readable medium including instructions, that, when executed, cause one or more processors of an Application Programming Interface (API) exchange to: receive, from a customer of the API exchange, a request for access to one or more APIs of a plurality of APIs corresponding to respective service provider networks and to which the API exchange provides access; bundle, based on the request for access, the one or more APIs into an API bundle; generate, based on the request, a unique subscription key for accessing the API bundle; send, to the customer, the unique subscription key; receive, from the customer, a service request for invoking a requested API of the one or more APIs of the API bundle, the service request including the unique subscription key for accessing the API bundle; and upon authorizing the service request to access the API bundle based on the unique subscription key, send the service request to the service provider network corresponding to the requested API.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
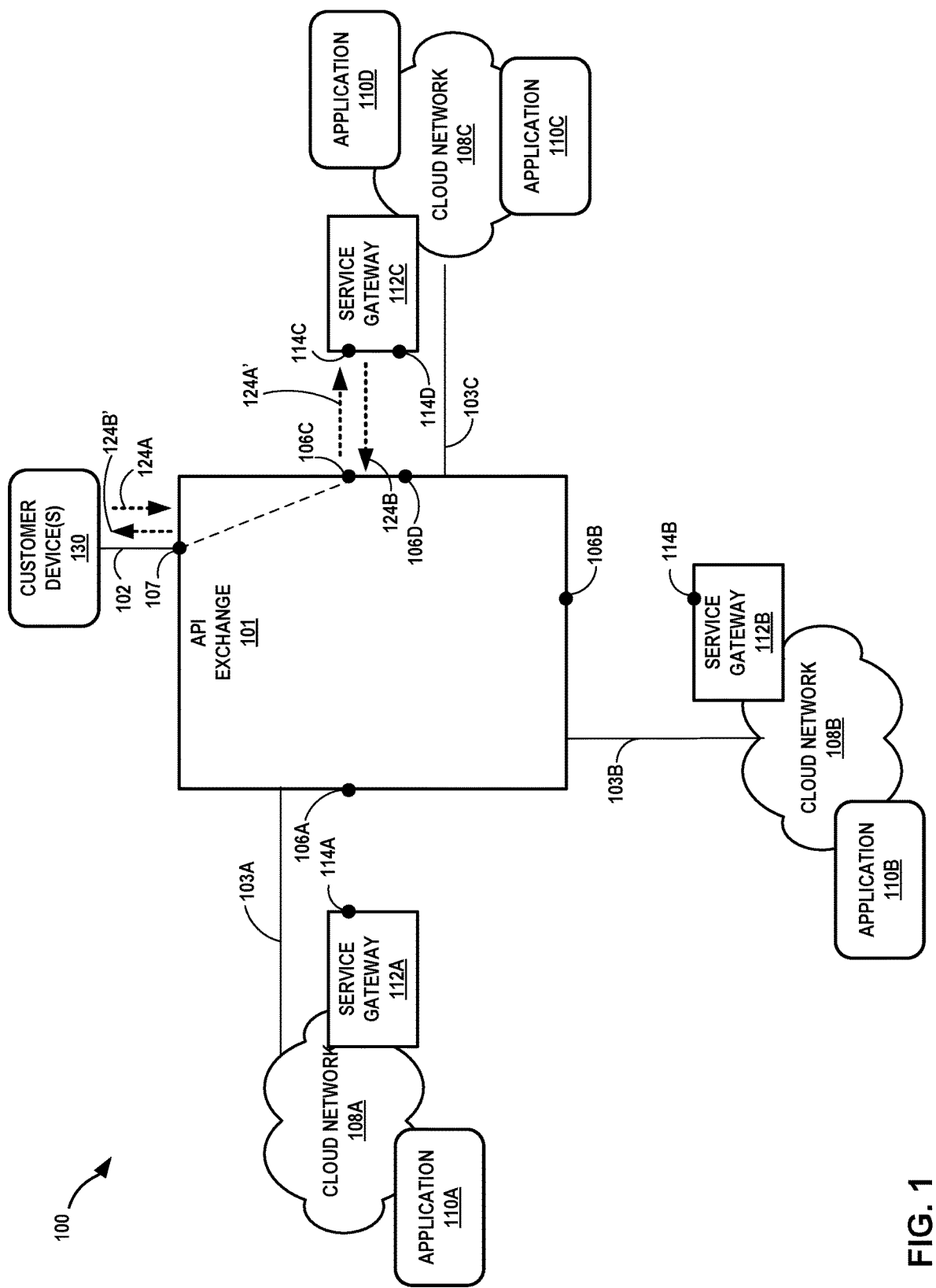
FIG. 1 is a block diagram illustrating an example API exchange system for creating and managing APIs exposed at multiple different API endpoints, in accordance with techniques of this disclosure.

The techniques of the disclosure describe a private API exchange that provides an interoperability platform that can power private Business-to-Business (B2B) API ecosystems. In one example, the API exchange enables a customer to access the APIs via a private channel rather than, e.g., the Internet. The API exchange provides seamless API interoperability enabling API providers to list their APIs in an API exchange, and further allows customers to consume a set or bundle of APIs using a single unique subscription key for the API bundle.

Conventional systems require a customer to access an API that is exposed via the Internet. Further, conventional systems require a provider to implement their own mechanism for access to the customer to allow the customer to consume those APIs. In contrast, the API exchange of the present disclosure does not require the customer to consume APIs in a private channel to access enterprise data. Rather, the API exchange of the present disclosure provides a private exchange with a customer may access a broad number of APIs. Further, the techniques of the disclosure allow a customer to consume more than one API (e.g., a bundle of APIs) via both OSI model Layer 2 and Layer 3. The techniques of the disclosure further provide a flexible approach for authorizing customers to access specific APIs of the exchange.

The API exchange of the present disclosure provides interoperability to seamlessly integrate provider services into customer applications and APIs. Through the API exchange of the present disclosure, providers may expose domain APIs such as marketing, infrastructure, payment, identity and messaging. The API exchange federates the multiple domain APIs to provide cross-provider reach.

In one example, a cloud services exchange implements an API exchange on top of a cloud services exchange point. The cloud services exchange further provides an API for accessing data center infrastructure monitoring (DCIM) feed data to the API exchange. A customer may use the API exchange to access the DCIM API to consume the DCIM feed data.

In some examples, the API exchange creates a virtual local area network (VLAN) specific to an API bundle to which the customer has a unique subscription key. The customer may access the API bundle by accessing the VLAN via a port of the cloud exchange point. In some examples, each unique subscription key corresponds to a single VLAN with which the customer may access a single API bundle. In other examples, each unique subscription key corresponds to a single VLAN with which the customer may access multiple API bundles. In still further examples, each unique subscription key corresponds to a subnet of a single VLAN with which the customer may access a subset of APIs of an API bundle. In some examples, the customer may request access to the APIs of an API bundle by using an existing key or by receiving, from the API exchange, a new unique subscription key. The customer may connect to multiple APIs of an API bundle using the unique subscription key and thereby may access feed data for the multiple APIs of the API bundle using the self-service capabilities provided by the API exchange. In some examples, the API exchange may authorize the customer to access an API bundle by determining that a unique subscription key specified by a service request corresponds to a specific VLAN from which the API exchange received the service request. Thus, by using the system of the present disclosure, the customer may access the APIs without getting on to the Internet.

In some examples, the API exchange may create an API bundle that comprises a group of one or more sets of one or more APIs. Each API bundle is associated with a unique subscription key. Each API bundle is further associated with a unique VLAN. In some examples, a customer may create more than one VLAN for an API bundle and configure sub-routing for each of the VLANs via a private gateway. In other examples, a single VLAN may be associated with multiple API bundles. The customer may use the private gateway to configure VLAN traffic to the appropriate API bundle. The API exchange of the present disclosure may further provide validation, discovery, authentication, and/or authorization services to customers accessing API bundles provided by the API exchange.

In further examples, enterprises may use the API exchange of the present disclosure as a marketplace to sell data feeds as APIs over a secure channel. In some examples, the data feeds comprise data feeds of various services provided by the cloud exchange point executing below the API exchange. Further, enterprises may create API bundles by grouping one or more APIs, which may provide a solution to specific domain use cases. In further examples, service providers may create API bundles that group multiple APIs of different providers into a single API bundle.

In some examples, the API exchange provides an ability to create an API or an API bundle on domain based on a customer contract and dynamically connect the customer to an appropriate data source. Thus, the techniques of the disclosure provide flexibility to expose enterprise data on demand as an API. In further examples, the API exchange may provide to a customer an exchange for accessing Internet of Things (IOT) device endpoints using a single IoT key.

In some examples, the API exchange of the present disclosure provides one or more of the following advantages:

The API exchange provides an end-user subscriber self-service registration portal.

The API exchange provides, to a customer, an API catalog and receives, from the customer, a subscription to one or more APIs or an API bundle listed by the API catalog.

A service provider for a cloud exchange point may list, on the API exchange, one or more APIs that provide access to data feeds of services offered by the cloud exchange point.

The API exchange creates an API bundle and provides a unique subscription key for the API bundle with which a customer may access one or more APIs of the API bundle.

A customer may purchase a port to access the cloud exchange point. The API exchange may create a specific VLAN on the port with which the customer may connect to the API exchange and privately access APIs.

The API exchange may provide a self-service portal that permits a provider register APIs, perform API lifecycle management, and/or provides a software development kit (SDK) for APIs and/or the API exchange, and that permits a customer to subscribe to APIs.

The API exchange may create a record of any transactions occurring through the API exchange.

The API exchange provides a unique subscription key to a customer with which the customer may access one or more APIs of an API bundle associated with the unique subscription key. The API exchange provides an API exchange gateway which is an abstraction layer between an API provider and a customer. The API exchange gateway may implement policy-based, template-based authentication of the customer for a private connection to the API exchange and allow connectivity to a VLAN for an API bundle based on the unique subscription key associated with the API bundle.

FIG. 1 is a block diagram illustrating an example API exchange system for creating and managing APIs exposed at multiple different API endpoints, in accordance with techniques of this disclosure. API exchange system 100 includes multiple cloud networks 108A-108C (collectively, "cloud networks 108") for respective customers 130 of a provider of API exchange 101.

Each of cloud networks 108 may represent one of an enterprise network; a cloud service provider network; a private, public, or hybrid cloud network; and a tenant network within a cloud network, for example. Each of cloud networks 108 is a layer 3 network and may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Each of cloud networks 108 includes one or more host servers (not shown) that each executes an instance of at least one of applications 110A-110D (collectively, "applications 110"). For example, one or more host servers of cloud network 108A each executes a service instance of application 110A, and the service instance processes service requests received at the network address and port of the host server assigned to the service instance. As another example, one or more host servers of cloud network 108C each executes a service instance of application 110C and/or a service instance of application 110D.

Host servers may include compute servers, storage servers, application server, or other computing device for executing applications that process service requests received via a network. Hosts servers may represent real servers or virtual servers, such as virtual machines, containers, or other virtualized execution environment.

Applications 110 offer services, such as data storage, eCommerce, billing, marketing, customer relationship management (CRM), social media, digital media, financial, weather, search, and other services accessible using machine-to-machine communication over the corresponding cloud network 108. Each of applications 110 may represent a different service. Each service instance hosted by a host server exposes a remote application programming interface (API) at a network address and port of the host server. The combination of network address and port mapped to an API exposed by a service instance executed by a host server is referred to as an "API endpoint" and, more specifically in this example where the service instances are logically situated behind service gateways 112, an "internal API endpoint." For example, a service instance of application 110D processes service requests received at a network address and port of the host server that executes the service instance, the service requests conforming to the API of the application 110D. Service requests may alternatively be referred to as "API requests."

Services offered by applications 110 may alternatively be referred to as "web services" in that the services communicate with other computing devices using application-layer protocols developed for the world-wide web, such as Hyper-Text Transfer Protocol (HTTP) or Simple Mail Transfer Protocol (SMTP), and operating over Internet Protocol networks. The services may operate in accordance with different service frameworks, such as Apache Axis, Java Web Services, Windows Communication Foundation (WCF), and .NET Framework, each of which makes use of one or more web service protocols to communicate service data between machines. Example web service protocols include JavaScript Object Notation (JSON)-Remote Procedure Call (RPC), Representational State Transfer (REST)ful services, Simple Object Access Protocol (SOAP), Apache Thrift, eXtensible Markup Language (XML)-RPC, and Web Services Description Language (WSDL).

In this example, administrators of cloud networks 108 deploy respective service gateways 112 to the cloud networks to expose internal APIs of service instances to clients 130 external to the cloud networks. For example, service gateway 112A of cloud network 108A operates as a single point of entry for the one or more service instances of application 110A and is responsible for service request routing to the service instances. That is, service gateway 112A routes service requests received at the service gateway 112 to target services offered by the one or more service instances of application 110A. Service gateway 112A may represent a server computing device executing a service gateway application. Service gateway 112A has a network address and may receive the service requests for routing at a transport-layer port, such as port 80 or 8080 for HTTP-based service requests, although any suitable transport-layer port may be mapped by the service gateway to a service. The combination of the network address and port for the service gateway application is a API endpoint 114A for the services exposed by the service gateway 112A. Service gateway 112B, 112C may be deployed and operate similarly to service gateway 112A as described above. Thus, service gateway 112B includes API endpoint 114B at which the service gateway 112B receives service requests for application 110B, and service gateway 112C includes API endpoints 114C, 114D at which the service gateway 112C receives service requests for applications 110C and 110D.

Besides routing service requests between requesters (i.e., issuers of service requests) and internal API endpoints, each of service gateways 112 may also verify requesters are authorized to make requests, prevent access to internal API endpoints by unauthorized requesters, perform load balancing among multiple service instances for the applications 110, throttle service requests, and/or translate web service protocols of received service requests to other web service protocols (e.g., transform RESTful protocols to SOAP) prior to routing the service requests, for example. Each of service gateways 112 may use a service discovery mechanism to identify internal API endpoints for a service offered by an application 110, and route service requests for the service to the internal API endpoints. Example service discovery mechanisms include client-side discovery and server-side discovery. Service gateways 112, in this manner, offer external APIs for reaching the internal API endpoints for applications 110.

Cloud networks 108 are coupled to an API exchange 101 by respective communication links 103A-103C (collectively, "communication links 103"). Cloud networks 108 and API exchange 101 exchange data communications via communication links 103, each of which may represent at least one Ethernet link, Asynchronous Transfer Mode (ATM) link, and SONET/SDH link, for example. Communication links 103 may each represent a layer 2 network, such as a local area network or virtual local area network (VLAN). Data communications may conform to the Open System Interconnection (OSI) model, Transmission Control Protocol (TCP)/Internet Protocol (IP) model, or User Datagram Protocol (UDP)/IP model. Data communications may include a layer 3 (i.e., network layer) packet having an Internet Protocol header that includes source and destination network addresses and layer 4 (e.g., transport layer protocol, such as TCP/UDP) source and destination ports. The Internet Protocol header also specifies the transport layer protocol for the data communication.

Cloud networks 108 may not have network connectivity with one another. That is, a device in cloud network 108A may be unable to send a network (layer 3) packet to a device in cloud network 108B or to a device in cloud network 108C, for there is no physical or virtual network configured to route network packets between the cloud networks 108. In some cases, cloud networks 108 may have network connectivity to one another only via communication links other than communication links 103.

API exchange 101 obtains API endpoint data describing API endpoints 114 for APIs exposed by service gateways 112. API endpoint data may include network address and port information for the API endpoints 114. API exchange 101 may perform service discovery to obtain the API endpoint data from service registries for the service gateways, for example, such as by sending service discovery messages to the service gateways. API exchange 101 may further obtain API description data for the APIs exposed by the service gateways 112 at API endpoints 114. API description data may describe protocols, methods, API endpoints, etc., that define acceptable service requests for the API endpoints for interacting with the services for applications 110. API description data may be formatted with WSDL.

In accordance with techniques described in this disclosure, API exchange 101 enables a customer to privately subscribe, via a unique subscription key, to bundles of APIs so as to consume feed data of services provided by cloud networks 108, the feed data enabled by the bundles of APIs. In this example, API exchange 101 enables API exchange endpoints 106 for sending and receiving service traffic with cloud networks 108. As used herein, "service traffic" may refer to service requests invoking APIs of service instances, as well as responses to such service requests (or "service responses").

Each API exchange endpoint 106 is a network address and port pair that is internally mapped, by the API exchange 101 using service mapping data, to one of API endpoints 114 for services provided by applications 110 executing by cloud networks 108. API exchange 101 receives from, e.g, customers 130, requests for access to one or more APIs provided by applications 110 at API exchange endpoints 106. In response to the requests for access, API exchange 101 bundles the one or more APIs into an API bundle and generates a unique subscription key for accessing the API bundle. In some examples, API exchange 101 creates a profile for a customer that stores a list of the one or more APIs within the API bundle and associates the unique subscription key with the API bundle. API exchange 101 sends the unique subscription key to customer device 130 for subsequent access of the API bundle.

API exchange 101 receives, from customer device 130, service requests for accessing one or more APIs of the API bundle. In some examples, the service request includes the unique subscription key. API exchange 101 uses the unique subscription key to authorize customer device 130 to access the one or more APIs. In some examples, to authorize customer device 130, API exchange 101 determines that the one or more APIs specified by the service request are within the list of the one or more APIs within the profile for the customer and that the one or more APIs specified by the service request are associated with the unique subscription key.

In some examples, the service request further includes user credentials of the customer. In such an example, API exchange 101 authenticates a user based on the user credentials. API exchange 101 may provide different levels of access to the API bundle based on both the unique subscription key and the user credentials. Thus, different users of customer devices 130 may use the same unique subscription key to access an API bundle, and API exchange 101 may authorize, based on user credentials for a particular user, access to different APIs within the API bundle or access to different levels of functionality (e.g., user-level or administrator-level access) to different APIs of the API bundle.

In some examples, API exchange 101 creates a record of service requests to each of the one or more APIs. Upon authorizing the service request to access the one or more APIs, API exchange 101 sends the service request to cloud network 108 to which the destination API exchange endpoints 106 corresponding to the API specified by the service request are mapped. In this way, API exchange 101 enables seamless API interoperability between customers 130 and cloud networks 108 by enabling API providers to list APIs in API exchange 101, and further allows customers 130 to consume bundles of APIs using a single unique subscription key for the API bundle.

In the example of FIG. 1, API exchange 101 maps API exchange endpoints 106A-106D to respective API endpoints 114A-114D of multiple cloud networks 108. In this example, API endpoints 114 are accessible via service gateways 112. For example, API exchange 101 maps API exchange endpoint 106A exposed by the API exchange 101 to API endpoint 114A exposed by service gateway 112A of cloud network 108A and usable for accessing the API of application 110A. API exchange 101 maps API exchange endpoint 106B exposed by the API exchange 101 to API endpoint 114B exposed by service gateway 112B of cloud network 108B and usable for accessing the API of application 110B. API exchange 101 maps API exchange endpoints 106C, 106D exposed by the API exchange 101 to API endpoints 114C, 114D exposed by service gateway 112C of cloud network 108C and usable for accessing the APIs of applications 110C, 110D. Consequently, and as described in further detail below, API exchange 101 enables customer device 130 to issue service requests to application 110A, despite customer device 130 not having network connectivity to cloud network 108A.

API exchange 101 receives a service request 124A from customer device 130. Service request 124A has a destination network address and destination port that match the network address and port of API exchange endpoint 106A. The service request 124A may conform to a web service protocol, such as any of the web service protocols listed above. For example, service request 124A may represent a REST communication using HTTP, a SOAP communication, or another type of service request that can invoke an API for application 110C. That is, service instances of the application 110A would recognize the service request 124A as a service request that invokes the API for application 110A. Service request 124A may be generated by customer device 130 and output from a computing device that executes the service instance and is connected to customer port 107 of API exchange 101 via communication link 102. Service request 124A includes service data for invoking an API offered by a service instance of application 110A.

API exchange 101 maps the service request 124A received at customer port 107 to API endpoint 114C and generates a new service request 124A'. Service request 124A' includes service data from service request 124A and includes a layer 4 header and a layer 3 header that causes the service request 124A' to be received at API endpoint 114C exposed by service gateway 112C. In other words, API exchange 101 rewrites at least the destination network address and destination port of the service request 124A, which is destined to API exchange endpoint 106C, to generate and output service request 124A', which is destined to API endpoint 114C. API exchange 101 may also generate the service request 124A' to have a source API endpoint as API exchange endpoint 106C mapped by API exchange 101 to API endpoint 114C. API exchange 101 outputs the service request 124A' via communication link 103C. Service gateway 112C receives the service request 124A' at the API endpoint 114C. API exchange 101 may proxy a transport-layer (e.g., TCP) session between API exchange 101 and customer device 130 and a transport-layer session between API exchange 101 and a service instance of application 110C. In this way, API exchange 101 creates a service-to-service path for service requests and service responses between customer device 130 and a service instance for application 110C, despite each of cloud networks 108 and customer device 130 not having inter-network connectivity with one another.

Service gateway 112C sends the service request 124A' for processing by a service instance of application 110C. In some cases, the service gateway 112C may generate a new service request 124A' with a layer 4 header and a layer 3 header having a destination port and a destination address for the service instance of application 110C. The service instance of application 110C may generate service response 124B responsive to service request 124A'. Service response 124B is destined for customer port 107 of API exchange 101 based on the source endpoint indicated by service request 124A'. API exchange 101 receives service response 124B at API exchange 106C and generates service response 124B' based on the mapping of customer port 107 to customer device 130. Service response 124B' is therefore destined for customer device 130. API exchange 101 outputs service response 124B' via communication link 102 to customer device 130. Customer device 130 receives service response 124B' at customer port 107 and processes service response 124B'.

In some examples, each of service gateways 112 exposes its registered APIs and corresponding API endpoints 114 with API exchange 101. Service gateway 112A may register APIs accessible at API endpoint 114A, service gateway 112B may register APIs accessible at API endpoint 114B, and service gateway 112C may register APIs accessible at API endpoints 114C and 114D, for example. In some cases, a CSP that operates each gateway 112 may register the APIs and API endpoints 114 via a portal application, such as CSP portal 330 described below with respect to FIGS. 2A-2B. API endpoints and API exchange endpoints may be indicated in part using Uniform Resource Locators (URLs) or Uniform Resource Identifiers, in part using transport-layer ports, or by explicitly specifying a network address and transport-layer port for the API endpoint, for example. As mentioned above, API exchange 101 may use service discovery to obtain API endpoints 114 for APIs of service gateways 112. API exchange 101 may publish the endpoints 114 to customers 130 for cloud networks 108, along with the APIs, in an API catalog that is accessible, for instance, via a portal deployed by a provider of the API exchange 101. In some examples, the API exchange 101 (or a CSP portal for API exchange 101 such as CSP portal 330), outputs an indication of accessibility of application programming interfaces at API exchanges. For example, API exchange 101 maps the registered endpoints 114 to API exchange endpoints 106 and publishes endpoints 106 to customers 130 for cloud networks 108, along with the APIs, in an API catalog. Applications 110 and service gateways 112 may consequently direct service requests for the APIs to API exchange endpoints 106 of the API exchange 101, which thereby impersonates the service gateways 112 using API exchange endpoints 106 to receive service requests ultimately destined for applications 110 behind API endpoints 114.

API exchange 101 may perform service discovery to identify API endpoints 114 for accessing APIs provided by cloud networks 108. In other examples, API exchange 101 exposes a discovery API, e.g., using a discovery Uniform Resource Locator (URL), in order to enable such service discovery by customer device 130. For example, customer device 130 may invoke the discovery API using a discovery request message that includes a parameter value that indicates application 110C. API exchange 101 provides a discovery response message that includes the network address and port for API exchange endpoint 106C that is mapped by the API exchange 101 to API endpoint 114C. Consequently, customer device 130 may direct service requests to API exchange endpoint 106C for delivery by API exchange 101 to API endpoint 114C exposed by service gateway 112C using techniques described above.

The techniques described herein enable API exchange 101 to receive and route service requests from customer device 130 to appropriate API endpoints 114 for respective applications 110 executing by multiple different cloud networks 108, despite such networks not having dedicated network connectivity with one another, at least in some cases. In this way, each of cloud networks 108 may avoid implementing their own API framework to directly interface with customer device 130. In effect, API exchange 101 substantially abstracts cloud networks 108 by providing service request routing between customers 130 and among cloud networks 108 and service segmentation between service gateways 112 according to access authorizations among the applications 110.

Moreover, the API exchange 101 may provide a neutral service for CSPs to peer API services between one another. As business processes become more fluid and interlaced in business ecosystems, CSPs may bundle one or more APIs into API bundles and offer the API bundles for purchase to customers 130. For example, API exchange 101 may provide access to an API bundle that includes one or more APIs provided by application 110A of cloud network 108 A as well as one or more APIs provided by application 110C of cloud network 108C. Each service may belong to a different organizational entity (and the digital service component the entity provides), and the flow may represent a new joint business offering. The API exchange 101 offers a layered service as the intersection point of digital business-to-business transactions among two or more CSPs that have deployed respective cloud networks 108. As described in further detail below, the API exchange 101 may be deployed to a services exchange, such as a cloud exchange or Internet exchange, and become an open digital business exchange for tenants having access to the services exchange or otherwise having applications executed by networks having access to the API exchange. In some cases, one or more tenant customers are directly co-located with the services exchange by deploying network and computing equipment for cloud networks 108 within a physical data center housing the services exchange. One or more tenant customer may also or alternatively be indirectly connected to the services exchange via a network service provider co-located within the physical data center and connected to the services exchange.

Figure 2A:
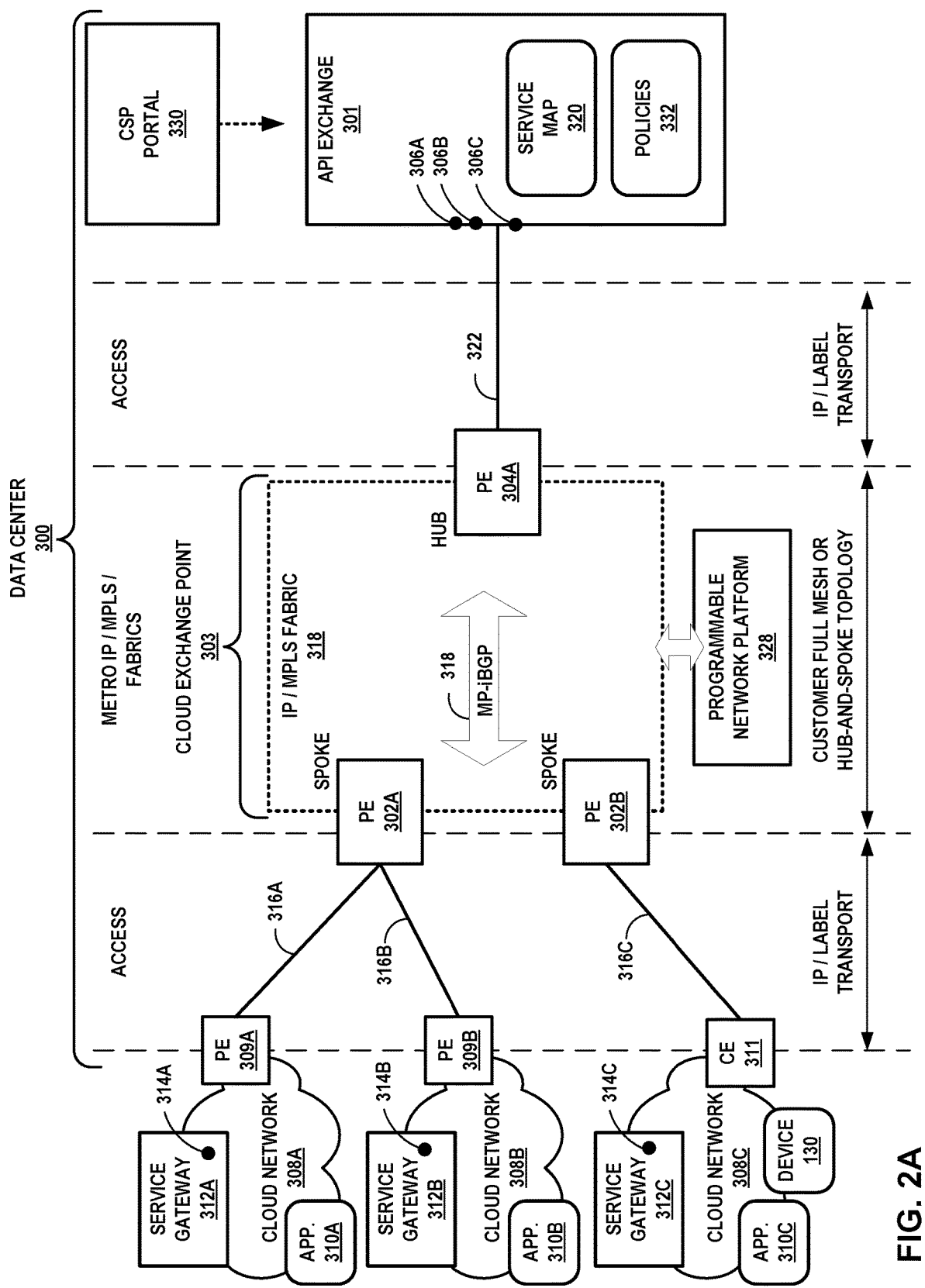
FIGS. 2A-2B are block diagrams illustrating an example cloud exchange point that is configurable by a programmable network platform to establish network connectivity between an API exchange and multiple cloud networks to enable access to APIs by applications executing by the cloud networks, according to techniques of this disclosure.
Figure 2B:
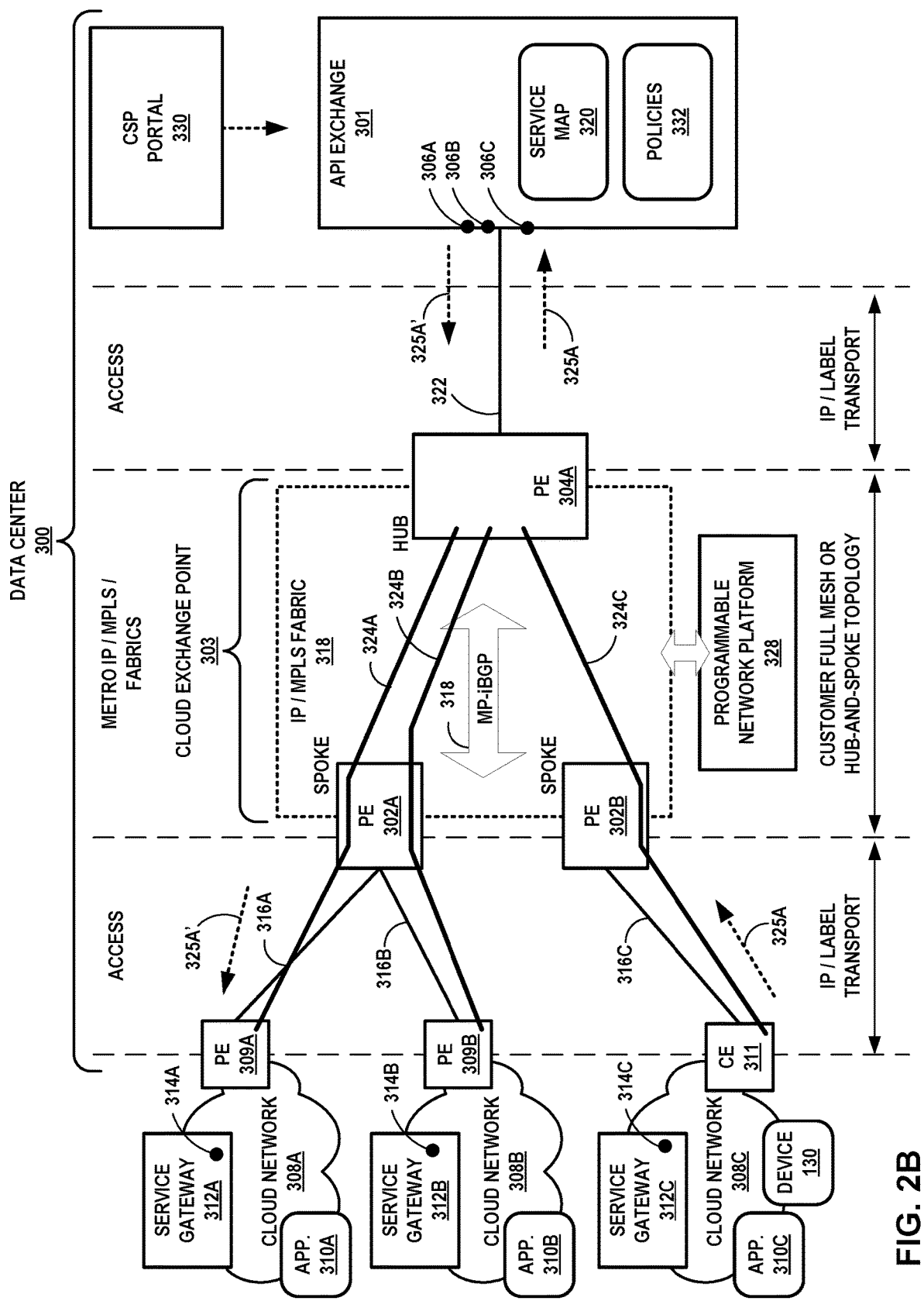

FIGS. 2A-2B are block diagrams illustrating an example cloud exchange point that is configurable by a programmable network platform to establish network connectivity between an API exchange and multiple cloud networks 308A-308C (collectively, "cloud networks 308") to enable access to APIs by applications executing by the cloud networks, according to techniques of this disclosure. Cloud exchange point 303, cloud networks 308, and API exchange 301 may represent an example instance of API system 100 of FIG. 1. Cloud networks 308 may represent example cloud networks 108, applications 310 may represent example applications 110, service gateways 312 may represent example service gateways 112, API endpoints 314 may represent example API endpoints 114, and API exchange 301 may represent an example API exchange 101.

Cloud networks 308, each associated with a different CSP of cloud exchange point 303, access cloud exchange point 303 within data center 300 to provide services to one or more customers 130 coupled to cloud exchange point 303. Cloud networks 308 (and customers 130) each include endpoint devices that provide and/or consume services. Example endpoint devices include real or virtual servers, smart phones, television set-top boxes, workstations, laptop/tablet computers, video gaming systems, teleconferencing systems, media players, and so forth.

Cloud networks 308A-308B include respective provider edge/autonomous system border routers (PE/ASBRs) 309A-309B. Each of PE/ASBRs 309A, 309B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a cloud network 308 and an edge router (or autonomous system border router) of cloud exchange point 303. For example, PE 309A and PE 302A may directly peer via an exterior gateway protocol, e.g., exterior BGP, to exchange L3 routes over access link 316A and to exchange L3 data traffic between cloud network 308A and cloud service provider networks 320. Access links 316 may in some cases represent and alternatively be referred to as attachment circuits for IP-VPNs configured in IP/MPLS fabric 318, as described in further detail below. Access links 316 may in some cases each include a direct physical connection between at least one port of a cloud network 308 and at least one port of cloud exchange point 303, with no intervening transit network. Access links 316 may operate over a VLAN or a stacked VLAN (e.g, QinQ), a VxLAN, an LSP, a GRE tunnel, or other type of tunnel.

While illustrated and primarily described with respect to L3 connectivity between cloud networks 308 and API exchange 301, PE routers 302 may additionally or alternatively offer, via access links 316, L2 connectivity between cloud networks 308 and API exchange 301. For example, a port of PE router 302A may be configured with an L2 interface that provides, to cloud network 308A, L2 connectivity to API exchange 301 via access link 316A, with the API exchange 301 coupled (either directly or via another network device) to a port of PE router 304A that is also configured with an L2 interface. The port of PE router 302A may be additionally configured with an L3 interface that provides, to cloud network 308A, L3 connectivity to cloud service provider 320B via access links 316A. PE 302A may be configured with multiple L2 and/or L3 sub-interfaces such that cloud network 308A may be provided, by the cloud exchange provider, with a one-to-many connection to API exchange 301 and one or more other network coupled to the cloud exchange point 303.

To create an L2 interconnection between a cloud network 308 and a API exchange 301, in some examples, IP/MPLS fabric 318 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a API exchange-facing port of 304A. In some cases, API exchange 301 and one or more cloud networks 308 may have access links to the same PE router 302, 304, which bridges the L2 traffic using the bridge domain. To create an L3 interconnection between a cloud network 308 and the API exchange 301, in some examples, IP/MPLS fabric 318 is configured with a L3 virtual routing and forwarding instances (VRFs).

In some examples of a cloud exchange point 303, any of access links 316 and aggregation links 322 may represent Network-to-Network Interface (NNI) links. Additional details of NNI links and provisioning of NNI links to facilitate layer 2 connectivity within a data center 300 are found in U.S. Pat. No. 8,537,845, issued Sep. 17, 2013, and entitled "Real time configuration and provisioning for a carrier Ethernet exchange," which is incorporated by reference herein in its entirety.

In this example, cloud network 308C is not an autonomous system having an autonomous system number. Cloud network 308C may represent an enterprise, network service provider, or other cloud network that is within the routing footprint of the cloud exchange point. Cloud network 308C includes a customer edge (CE) device 311 that may execute exterior gateway routing protocols to peer with PE router 302B over access link 316C. In various examples, any of PEs 309A-309B may alternatively be or otherwise represent CE devices. Cloud networks 308A-308B may or may not be autonomous systems having an autonomous system number. In some examples, cloud network 308C may include customer devices 130 of FIG. 1.

Access links 316 include physical links and may include one or more intermediate switching devices. PE/ASBRs 309A-309B, CE device 311, and PE routers 302A-302B exchange L2/L3 packets via access links 316. In this respect, access links 316 constitute transport links for cloud access via cloud exchange point 303.

Cloud exchange point 303, in some examples, aggregates access by cloud networks 308 to other networks coupled to the cloud exchange point 303. FIGS. 2A-2B, e.g., illustrate access links 316A-316B connecting respective cloud networks 308A-308B to PE router 302A of cloud exchange point 303 and access link 316C connecting cloud network 308C to PE router 302B. Any one or more of PE routers 302, 304 may comprise ASBRs. PE routers 302, 304 and IP/MlPLS fabric 318 may be configured according to techniques described herein to interconnect any of access links 316 to access link 322. As a result, cloud service provider network 320A, e.g., needs only to have configured a single cloud aggregate link (here, access link 322A) in order to provide services to multiple cloud networks 308. That is, the cloud service provider operating cloud service provider network 302A does not need to provision and configure separate service links from API exchange 301 to PE routers 309, 311, for instance, in order to provide services to each of cloud networks 308. Cloud exchange point 303 may instead interconnect access link 322 coupled to PE 304A and API exchange 301 to multiple cloud access links 316 to provide layer 3 peering and network reachability for the service traffic between any of cloud networks 308 and API exchange 301.

In addition, a single cloud network, e.g., cloud network 308A, need only to have configured a single cloud access link (here, access link 316A) to the cloud exchange point 303 within data center 300 in order for API exchange 301 to provide services peering to cloud networks 308 also coupled to cloud exchange point 303. That is, the operator of API exchange 301 does not need to provision and configure separate service links connecting API exchange 301 in order to provide API exchange services to multiple cloud networks 308. Cloud exchange point 303 may instead interconnect each of cloud access links 316A-316B (again, as one example) to access link 322 to provide layer 3 peering and network reachability for the cloud services delivery to cloud networks 308A-308C.

In some cases, API exchange 301 may be coupled to a PE router (not shown) that is coupled to access link 322. The PE router may execute an exterior gateway routing protocol, e.g., eBGP, to exchange routes with PE router 304A of cloud exchange point 303.

In the illustrated example, an Internet Protocol/Multiprotocol label switching (IP/MPLS) fabric 318 interconnects PEs 302 and PE 304A. IP/MPLS fabric 318 include one or more switching and routing devices, including PEs 302, 304A, that provide IP/MPLS switching and routing of IP packets to form an IP backbone. In some example, IP/MPLS fabric 318 may implement one or more different tunneling protocols (i.e., other than MPLS) to route traffic among PE routers and/or associate the traffic with different IP-VPNs. In accordance with techniques described herein, IP/MPLS fabric 318 implement IP virtual private networks (IP-VPNs) to connect any of cloud networks 308 with API exchange 301 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 303 as described herein 'transports' service traffic and interconnects API exchange 301 to cloud networks 308 within the high-bandwidth local environment of data center 300 provided by a data center-based IP/MPLS fabric 318. In some examples, IP/MPLS fabric 318 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a cloud network 308 and API exchange 301 may connect via respective links to the same PE router of IP/MPLS fabric 318.

Access links 316 and access link 322 may include attachment circuits that associate traffic, exchanged with the connected cloud network 308 or API exchange 301, with virtual routing and forwarding instances (VRFs) configured in PEs 302, 304A and corresponding to IP-VPNs operating over IP/MPLS fabric 318. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with a PE device or network switch for API exchange 301 on a bidirectional label-switched path (LSP) or VLAN operating over access link 322, the LSP or VLAN being an attachment circuit for a VRF configured in PE 304A. Each VRF may include or represent a different routing and forwarding table with distinct routes.

PE routers 302, 304 of IP/MPLS fabric 318 may be configured in respective hub-and-spoke arrangements for cloud services, with PE 304A implementing a hub and PEs 302 being configured as spokes of the hubs (for various hub-and-spoke instances/arrangements). A hub-and-spoke arrangement ensures that service traffic is enabled to flow between a hub PE and any of the spoke PEs, but not between different spoke PEs. Hub-and-spoke VPNs may in this way enable complete separation between cloud networks 308. As described further below, in a hub-and-spoke arrangement for data center-based IP/MPLS fabric 318 and for customer-bound service traffic (i.e., from API exchange 301 to a cloud network 308) PEs 302 advertise routes, received from PEs 309, 311, to PE 304A. For API exchange-bound service traffic (i.e., from a cloud network 308 to API exchange 301), PE 304A advertises routes for API exchange 301 to PEs 302, which advertise the routes to PEs 309, CE 311. As used herein, a hub VRF exports routes having an "up" route target (RT) while a spoke VRF imports routes having an "up" route target. Conversely, a spoke VRF exports routes having a "down" route target while a hub VRF imports routes having a "down" route target. In some examples, each VRF instance has a unique route distinguisher (RD).

For some customers of cloud exchange point 303, the provider of cloud exchange point 303 may configure a full mesh arrangement whereby a set of PEs 302, 304A each couples to a different customer site network for the customer. In such cases, the IP/MPLS fabric 318 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

In some examples, PE routers may couple to one another according to a peer model without use of overlay networks. That is, PEs 309, CE 311 and a network for API exchange 301 may not peer directly with one another to exchange routes, but rather indirectly exchange routes via IP/MPLS fabric 318. In the example of FIG. 2B, programmable network platform 328 configures cloud exchange point 303 to implement multiple virtual circuits 324A-324C (collectively, "virtual circuits 324") for interconnecting cloud network 308 and API exchange 301 with end-to-end IP paths. Each of API exchange 301 and cloud networks 308 may be an endpoint for multiple virtual circuits 324, with multiple virtual circuits 324 traversing one or more attachment circuits between a PE/PE or PE/CE pair for the IP/MPLS fabric 318 and the customer or API exchange 301. A virtual circuit 324 may represent a layer 3 path through IP/MPLS fabric 318 between an attachment circuit connecting a cloud network to the fabric 318 and an attachment circuit connecting the API exchange 301 to the fabric 318. Each virtual circuit 324 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 324 may be implemented using a different hub-and-spoke network configured in IP/MPLS network 301 having PE routers 302, 304A exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 324A, PE 304A may associate a route for reaching API exchange 301 with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 309B via a routing protocol connection with PE 309B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from cloud networks 308 to cloud service providers 320 (and vice-versa), even though the cloud exchange point 303 may be based within a data center. PE router 310B installs the route to a routing database, such as a BGP routing information base (RIB) to provide layer 3 reachability to API exchange 301. In this way, cloud exchange point 303 "leaks" routes from for API exchange 301 to cloud networks 308, without API exchange 301 and cloud networks 308 requiring a direct layer peering connection.

PE routers 309B, 302A, and 304A may perform a similar operation in the reverse direction to forward routes originated by cloud network 308B to PE 304A and thus provide connectivity from API exchange 301 to cloud network 308B. In the example of virtual circuit 324A, PE routers 309A, 304A, and 302A exchange routes for cloud network 308A and API exchange 301 in a manner similar to that described above for establishing virtual circuit 324B. As a result, cloud exchange point 303 within data center 300 may internalize the peering connections that may otherwise be established between a network device for API exchange 301 and each of PEs 309A, 309B so as to perform aggregation for services provided by API exchange 301 to multiple cloud network 308, via a single access ink 322 to the cloud exchange point 303. Absent the techniques described herein, fully interconnecting cloud networks 308 and API exchange 301 would require peering connections between each of PEs 309, CE 311 and a network device for API exchange 301. With the techniques described herein, cloud exchange point 303 may fully interconnect cloud networks 308 and API exchange 301 with one peering connection per site edge device (i.e., for each of PEs 309, CE 311 and the network device for API exchange 301) by internalizing the layer 3 peering and providing data center-based 'transport' between access interfaces.

In examples in which IP/MPLS fabric 318 implements BGP/MPLS IP-VPNs or other IP-VPNs that use route targets to control route distribution within the IP backbone, PE 304A may be configured to import routes from PEs 302 and to export routes for API exchange 301, using different asymmetric route targets. Likewise, PEs 302 may be configured to import routes from PE 304A and to export routes received from PEs 309, CE 311 using the asymmetric route targets. Thus, PEs 302, 304A may be configured to implement advanced L3VPNs that each includes a basic backbone L3VPN of IP/MPLS fabric 318 together with extranets of any of cloud networks 308 and API exchange 301 attached to the basic backbone L3VPN. Each advanced L3VPN constitutes a cloud service delivery network from API exchange 301 to one or more cloud networks 308, and vice-versa. In this way, cloud exchange point 303 enables API exchange 301 to exchange service traffic with any cloud network 308 while internalizing the layer 3 routing protocol peering connections that would otherwise be established between pairs of cloud networks 308 and a network for API exchange 301 for a service connection between a given pair. In other words, the cloud exchange point 303 allows each of cloud networks 308 and a API exchange 301 network to establish a single (or more for redundancy or other reasons) layer 3 routing protocol peering connection to the data center-based layer 3 interconnection. By filtering routes from the network for API exchange 301 to cloud networks 308, and vice-versa, PEs 302, 304A thereby control the establishment of virtual circuits 324 and the flow of associated service traffic between cloud networks 308 and API exchange 301 within a data center 300. Routes distributed into MP-iBGP mesh 318 may be VPN-IPv4 routes and be associated with route distinguishers to distinguish routes from different sites having overlapping address spaces.

Additional details of an example interconnection platform and programmable network platform for configuring a cloud exchange point are described in U.S. patent application Ser. No. 15/001,766, filed Jan. 20, 2016, and entitled "MULTI-CLOUD, MULTI-SERVICE DATA MODEL"; and U.S. patent application Ser. No. 14/927,451, filed Oct. 29, 2015, entitled "INTERCONNECTION PLATFORM FOR REAL-TIME CONFIGURATION AND MANAGEMENT OF A CLOUD-BASED SERVICES EXCHANGE"; the entire content of each of which is incorporated by reference herein. A customer of the provider of cloud exchange point 303 and associated with cloud network 308A may request an interconnection, such as a virtual circuit, with the API exchange 301 using CSP portal 330 or by invoking one or more APIs of the programmable network platform 328 for requesting a virtual circuit. In response, the programmable network platform 328 configures the virtual circuit 324A to create the virtual circuit 324A. Cloud network 308A subsequently communicates with API exchange 301 using virtual circuit 324A.

API exchange 301 exposes API exchange endpoints 306A-306C reachable from cloud exchange point 303 via access link 322 with PE 304A. API exchange endpoints 306 are also reachable from any cloud network 308 coupled to the cloud exchange point 303 and having a virtual circuit 324 for an interconnection with API exchange 301. API exchange endpoints 306 may represent example instances of API exchange endpoints 106. API exchange 301 stores configuration data in the form of a service map 320 that maps API exchange endpoints 306 to respective API endpoints 314 for accessing applications 310 via service gateways 312. For example, service map 320 may map API exchange endpoint 306A to API endpoint 314A, map API exchange endpoint 306B to API endpoint 314B, and map API exchange endpoint 306C to API endpoint 314C. Service map 320 may represent an associative data structure, such as a table, map, or dictionary.

API exchange 301 receives service requests from cloud exchange point 303 via access link 322 and determines corresponding destination API endpoints 314 for the service requests using service map 320. In the example of FIG. 2B, customer device 130 originates a service request 325A destined for API exchange endpoint 306A. Cloud network 308C outputs the service request 325A to cloud exchange point 303 via access link 316C on virtual circuit 324C. Cloud exchange point 303 forwards the service request 325A using virtual circuit 324C to API exchange 301, which receives service request 325 via access link 322.

API exchange 301 receives service request 325A at API exchange endpoint 306A. API exchange 301 queries service map 320, using the API exchange endpoint 306A information as a lookup key, to determine the API endpoint mapped to API exchange endpoint 306A. In some examples, service request 325A includes a unique subscription key. API exchange 301 authorizes service request 325A by determining that the unique subscription key is associated with the API endpoint mapped to API exchange endpoint 306A. In some examples, API exchange 301 adds service request 325A to a record of service requests to the one or more APIs. Upon authorizing service request 325A, API exchange 301 generates a new service request 325A' from service request 325A. Service request 325A' includes service data from service request 325A and includes a layer 4 header and a layer 3 header that causes the service request 124A' to be received at API endpoint API endpoint 314A exposed by service gateway 312A. For example, API exchange 301 may rewrite at least the destination network address and destination port of the service request 325A, which is destined to API exchange endpoint 306A, to generate and output service request 325A', which is destined to API endpoint 314A. API exchange 301 may also generate the service request 325A' to have a source API endpoint as API exchange endpoint 306C mapped by API exchange 301 to API endpoint 314C of service gateway 312C for customer device 130 that originated service request 325A.

API exchange 301 outputs the service request 325A' via access link 322. Cloud exchange point 303 determines service request 325A' is destined for API endpoint 314A and is to be forwarded using virtual circuit 324A. API exchange 301 may output the service request 325A' on a VLAN or other attachment circuit for an IP-VPN or other virtual network with cloud network 308A. Cloud exchange 303 may forward the service request 325A' using virtual circuit 324A based in part on the attachment circuit on which PE 304A receives the service request 325A'. Cloud network 308A receives the service request 325A' from cloud exchange point 303 via access link 316A.

Service gateway 312A receives the service request 325A' at the API endpoint 314A. Service gateway 312A sends at least the service data from the service request 325A' to application 310A for processing.

API exchange 301 may proxy a transport-layer (e.g., TCP) session between customer device 130 and API exchange 301 and a transport-layer session between API exchange 301 and a service instance of application 310A. In this way, API exchange 301 creates a service-to-service path between customer device 130 and a service instance for application 310A, despite cloud networks 108A, 108C not having network connectivity with one another, at least via cloud exchange point 303. Customer device 130 and the service instance for application 310A may privately exchange service traffic via the service-to-service path that includes API exchange 301.

Policies 332 enable service segmentation among applications 310 executing by cloud networks 308. That is, API exchange 301 determines, based on policies 332, those sets (e.g., pairs) of applications 310 for which API exchange 301 will provide a service-to-service path by delivering service requests and service responses to one another. In this way, policies 332 prevent API exchange 301 from providing visibility into service traffic by service gateways 312 other than for service traffic directed to each service gateway. In addition, each service gateway 312 is only allowed to make service requests to other service gateways 312 as permitted by policies 332. An administrator or operator for API exchange 301 may also configure policies 332. In this way, API exchange 301 that applies policies 332 operates as a mediator between applications 310 to secure and control service flows. In some examples, CSP portal 330 provides self-service automation to customers for configuring policies 332.

For example, CSP portal 330 represents an application that may provide a user interface for CSP administrators to configure operations for API exchange 301, in particular to list available APIs for consumption by customer devices 130 and to configure service map 320 and policies 332. CSP portal 330 may provide a web interface or other graphical user interface accessible via a website, for configuring policies 332. One or more computing devices, such as real servers, execute CSP portal 330. An operator for API exchange 301 may also use a CSP portal 330 to configure service map 320 and policies 332.

Policies 332 may include policies for security, mediation, routing, service transformation, and service throttling, for example. Policies 332 may be customer-specific (i.e., established for a particular customer, or global). Security policies include policies for authentication, authorization, validation, and encryption, for instance. For example, policies 332 may require that API exchange 301 authorize service requests using credentials or previously-obtained login tokens, using a security protocol such as OAuth 2.0, X.509, Kerberos, or a username and password. Security policies may also determine whether a user, service instance, or service gateway 312 of one of cloud networks 308 is authorized to issue service requests to a service gateway 312 (or API endpoint 314) of another one of cloud networks 308.

Routing policies of policies 332 cause API exchange 301 to direct matching service requests to particular target API endpoints. While illustrated as a separate data structure, service map 320 may in some instances be realized using policies 332. Routing policies may match service requests based on application data therein, the originator of the service request, and the destination API exchange endpoint 306, for example. Service throttling policies of policies 332 may throttle service requests to a customer based on the service, the originator of the service requests, or other criteria. Load balancing may be applied by the service gateways 312 for service requests received at API endpoints 314.

Service map 320 maps API exchange endpoints 306 to respective API endpoints 314 for accessing, from cloud networks 308, remote applications 310 via service gateways 312. As noted above, service map 320 may be realized using routing policies of policies 332.

In the example of FIG. 2B, API exchange 301 may apply policies 332 to authenticate and/or authorize customer device 130 to send service requests to API endpoint 314A via API exchange endpoint 306A. API exchange 301 may return an authorization token to the authorized entity. Service request 325A may include an authorization token or other credential, such as a unique subscription key for accessing one or more APIs grouped into an API bundle through which API exchange 101 provides access. API exchange 301 may apply policies 332 and service map 320 to service request 325A received at API exchange endpoint 306C to authorize, throttle, or route a representation of service request 325A to API endpoint 314A as service request 325A'.

Figure 3:
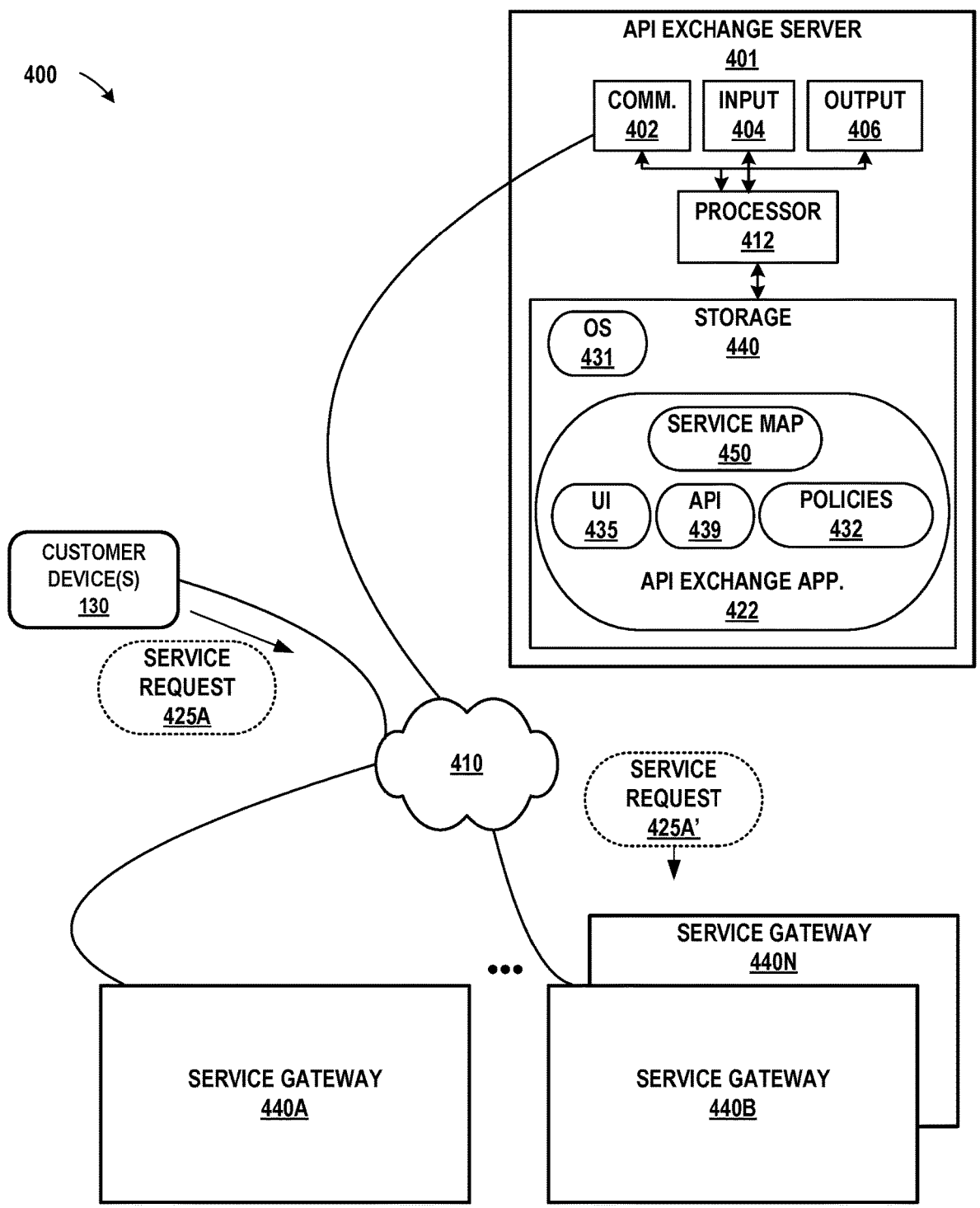
FIG. 3 is a block diagram illustrating an example API exchange system, according to techniques of this disclosure.

FIG. 3 is a block diagram illustrating an example API exchange system 400, according to techniques of this disclosure. API exchange system 400 includes a API exchange server 401 in communication with an exchange 410, as well as multiple service gateways 440A-440N in communication with the exchange 410. Exchange 410 may represent an Internet exchange, an Ethernet exchange, or a cloud exchange, such as cloud exchange point 303, which may be managed by a data center provider for a data center in which cloud networks for service gateways 440 are co-located to exchange network traffic with other cloud networks.

API exchange server 401 may provide a API exchange as described in FIGS. 1, 2A, 2B. API exchange server 401 may include one or more communication units 402, one or more input devices 404, and one or more output devices 406. API exchange server 401 includes one or more processors 412 and one or more storage devices 440. The one or more storage devices 440 include operating system 431 and API exchange application 422. One or more of the devices, modules, storage areas, or other components of API exchange server 401 may be interconnected to enable inter-component communications (physically, communicatively, and/or operatively). In some examples, such connectivity may be provided by through system bus, a network connection, an inter-process communication data structure, or any other method for communicating data. The API exchange application 422 may be executed in a distributed manner by multiple servers, of which API exchange server 401 is an example.

One or more input devices 404 of API exchange server 401 may generate, receive, or process input. Such input may include input from a keyboard, pointing device, voice responsive system, video camera, button, sensor, mobile device, control pad, microphone, presence-sensitive screen, network, or any other type of device for detecting input from a human or machine.

One or more output devices 406 of API exchange server 401 may generate, transmit, or process output. Examples of output are tactile, audio, visual, and/or video output. Output devices 406 may include a display, sound card, video graphics adapter card, speaker, presence-sensitive screen, one or more USB interfaces, video and/or audio output interfaces, or any other type of device capable of generating tactile, audio, video, or other output. Output devices 406 may include a display device, which may function as an output device using technologies including liquid crystal displays (LCD), quantum dot displays, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 402 of API exchange server 401 may communicate with devices external to API exchange server 401 by transmitting and/or receiving data, and may operate, in some respects, as both an input device and an output device. In some examples, communication units 402 may communicate with other devices over a network, including with customer devices 130 or service gateways 440 via exchange 410. In other examples, communication units 402 may send and/or receive radio signals on a radio network such as a cellular radio network. In other examples, communication units 402 of API exchange server 401 may transmit and/or receive satellite signals on a satellite network such as a Global Positioning System (GPS) network. Examples of communication units 402 include a network interface card (e.g. such as an Ethernet card), an optical transceiver, a radio frequency transceiver, a GPS receiver, or any other type of device that can send and/or receive information. Other examples of communication units 402 may include Bluetooth®, GPS, 3G, 4G, and Wi-Fi® radios found in mobile devices as well as Universal Serial Bus (USB) controllers and the like.

One or more processors 412 of API exchange server 401 may implement functionality and/or execute instructions. Examples of processors 412 include microprocessors, application processors, display controllers, auxiliary processors, one or more sensor hubs, and any other hardware configured to function as a processor, a processing unit, a processing device, or processing circuitry. API exchange server 401 may use one or more processors 412 to perform operations in accordance with one or more aspects of the present disclosure using software, hardware, firmware, or a mixture of hardware, software, and firmware stored by and/or executing at API exchange server 401.

One or more storage devices 420 may store information for processing during operation of API exchange server 401. In some examples, one or more storage devices 420 are temporary memories, meaning that a primary purpose of the one or more storage devices is not long-term storage. Storage devices 420 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 420, in some examples, also include one or more computer-readable storage media. Storage devices 420 may be configured to store larger amounts of information than volatile memory. Storage devices 420 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 420 may store program instructions and/or data associated with one or more of the modules described in accordance with one or more aspects of this disclosure.

One or more processors 412 and one or more storage devices 420 may provide an operating environment or platform for one or more modules, which may be implemented as software, but may in some examples include any combination of hardware, firmware, and software. One or more processors 412 may execute instructions and one or more storage devices 420 may store instructions and/or data of one or more modules. The combination of processors 412 and storage devices 420 may retrieve, store, and/or execute the instructions and/or data of one or more applications, modules, or software. Processors 412 and/or storage devices 420 may also be operably coupled to one or more other software and/or hardware components, including, but not limited to, one or more of the components illustrated in FIG. 3.

One or more modules or applications illustrated in FIG. 3 as being included within storage devices 420 (or modules otherwise described herein) may perform operations described using software, hardware, firmware, or a mixture of hardware, software, and firmware residing in and/or executing at API exchange server 401. API exchange server 401 may execute each of the module(s) with multiple processors or multiple devices. API exchange server 401 may execute one or more of such modules natively, or as a virtual machine or container executing on underlying hardware. One or more of such modules may execute as one or more services of an operating system 431 or computing platform. One or more of such modules may execute as one or more executable programs at an application layer of an operating platform provided by operating system 431.

User interface module 435 may manage user interactions with one or more user interface devices, which may include one or more of input devices 404 and one or more of output devices 406. In some examples, API exchange server 401 may include a presence-sensitive display that may serve as a user interface device and that may be considered both an input device 404 and an output device 406. In some examples, user interface module 435 may act as an intermediary between various components of API exchange server 401 to make determinations based on user input detected by one or more user interface devices and/or one or more input devices 404 and generate output at a user interface device or one or more output devices 406.

User interface module 435 may receive instructions from an application, service, platform, or other module of API exchange server 401 to cause a user interface device (e.g., presence-sensitive display) to output a user interface. User interface module 435 is illustrated as a module of the API exchange application 422, but user interface module 436 may often be or execute a sub-component of an operating system controlling operation of API exchange server 401, and user interface module 435 may alternatively or also be a stand-alone application, service, or module executing at API exchange server 401. User interface module 435 may manage inputs received by API exchange server 401 as a user views and interacts with a user interface presented and update the user interface in response to receiving additional instructions from the application, service, platform, or other module of API exchange server 401 that is processing the user input. As further described below, user interface module 435 may output a portal and receive input data (e.g., exchange rate data) from input devices 404 accessible by a customer or administrator of API exchange server 401 to specify and/or manipulate policies 432.

Storage devices 420 may include an operating system 431 and a API exchange application 422 for performing operations related to providing a API exchange for exchanging service requests among service gateways 440. API exchange application 422 may interact with and/or operate in conjunction with one or more modules of API exchange server 401. API exchange application 422 may listen for network packets at API exchange endpoints of API exchange server 401. Operation system 431 may execute a networking stack and deliver network packets destined for the API exchange endpoints to API exchange application 422. A service request may be included in one or more network packets. Each API exchange endpoint is a combination of a network-layer (L3) address and a transport-layer (L4) port for API exchange server 401.

A user may invoke user interface 436 or application programming interface 439 for API exchange application 422 to configure policies 432. Policies 432 may represent example instances of policies 332. Communication units 402 may receive API endpoint data describing one or more API endpoints for one or more API endpoints. The one or more processors 412 executing API exchange application 422 processes the API endpoint data, requests API exchange endpoints from operating system 431, and maps the API exchange endpoints to corresponding API endpoints indicated by the API endpoint data. The processors 412 generate service map 450 for the mappings of the API exchange endpoints to the API endpoints, and vice-versa.

API exchange server 401 receives a service request 425A from customer device 130, via communication unit 402 and network exchange 410. The service request 425A is destined for a API exchange endpoint of API exchange 401. Service request 425A may represent an example instance of any of the service requests described this disclosure. In some examples, service request 425A includes a unique subscription key associated with one or more APIs specified by service request 425A. Operating system 431 delivers service request 425A to API exchange application 422, which listens on the API exchange endpoint, for processing. Service request 425A may arrive as one or more packets.

In accordance with one or more aspects of the present disclosure, the one or more processors 412 executing API exchange application 422 process service request 425A by authorizing service request 425A based on the unique subscription key specified by service request 425A. Upon authorizing service request 425A, the one or more processors 412 executing API exchange application 422 apply policies 332 to output a representation of the service request 425A to a API endpoint of service gateway 440B. Processors 412 apply service map 450 to map the destination API exchange endpoint of service request 425A to a API endpoint of service gateway 440B. A service map 450 may match on the destination network address and destination port of one or more packets of the service request 425A and specify a destination endpoint of service gateway 440B. In response, processors 412 generate service request 425A' having a destination network address and destination port that are the specified destination endpoint of service gateway 440B. Processors 412 may generate service request 425A' to have a source network address and source port that is a API exchange endpoint of API exchange server 401. In this way, API exchange server 401 impersonates customer device 130 to service gateway 440B. Processors 412 output, via communication unit 402, the service request 425A' for delivery via network exchange 410.

Figure 4:
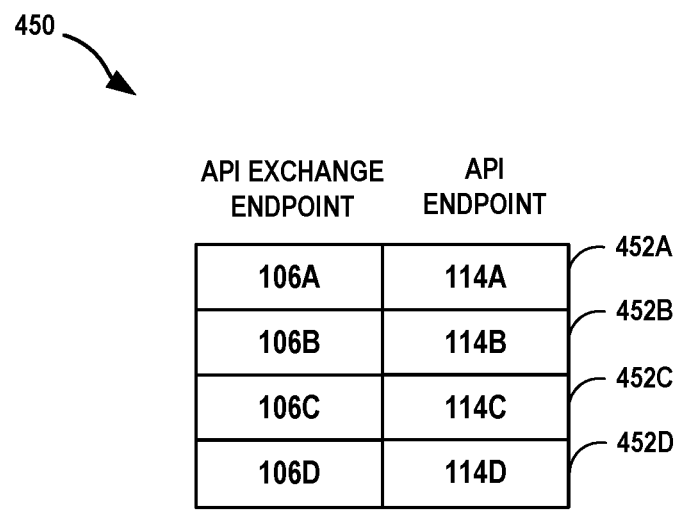
FIG. 4 is an example API map, according to techniques of this disclosure.

FIG. 4 is an example API map, according to techniques of this disclosure. API map 450 is an associative data structure having multiple entries 452A-452D that each maps an API exchange endpoint of an API exchange to an API endpoint for an API exposed by a service, such as an API endpoint exposed by a service gateway, and vice-versa. For example, entry 452A maps API exchange endpoint 106A to API endpoint 114A. API map 450 may store each API endpoint and API exchange endpoint as combinations of a network address and transport-layer port. API map 450 may include a hash table such that entries 452 are hash buckets having hash values corresponding to values of a hash function applied to the API endpoint or API exchange endpoints, with the hash value of an API exchange endpoint being mapped to the API endpoint and the hash value of an API endpoint being mapped to an API exchange endpoint. Example hash functions include SHA-1 and MD5.

Figure 5:
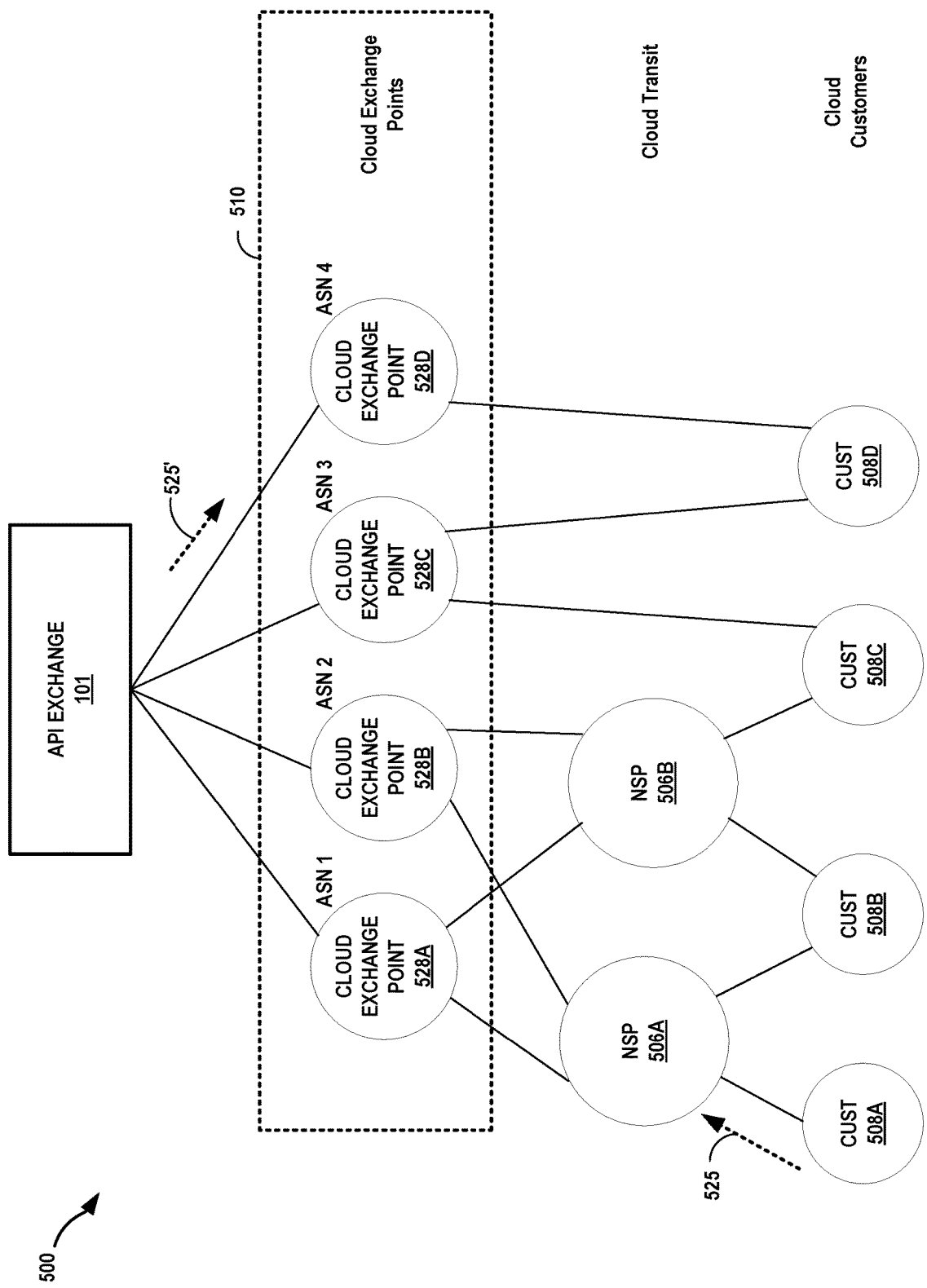
FIG. 5 is a block diagram that illustrates a conceptual view of an API exchange system having a metro-based cloud exchange that provides multiple cloud exchange points for communication with an API exchange, according to techniques described herein.

FIG. 5 is a block diagram that illustrates a conceptual view of an API exchange system having a metro-based cloud exchange that provides multiple cloud exchange points for communication with an API exchange, according to techniques described herein. Each of cloud-based services exchange points 528A-528D (described hereinafter as "cloud exchange points" and collectively referred to as "cloud exchange points 528") of cloud-based services exchange 510 ("cloud exchange 510") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") (not shown in FIG. 5) connect to receive and provide, respectively, cloud services. In various examples, cloud exchange 510 may include more or fewer cloud exchange points 528. In some instances, a cloud exchange 510 includes just one cloud exchange point 528. As used herein, reference to a "cloud exchange" or "cloud-based services exchange" may refer to a cloud exchange point. A cloud exchange provider may deploy instances of cloud exchanges 510 in multiple different metropolitan areas, each instance of cloud exchange 510 having one or more cloud exchange points 528.

Each of cloud exchange points 528 includes network infrastructure and an operating environment by which customers 508A-508D (collectively, "cloud customers 508") exchange API service requests and receive API feed data via API exchange 101. Each of customers 508 may have one or more API gateways (not shown in FIG. 5). Cloud customers 508 may exchange service requests and service responses directly via a layer 3 peering and physical connection to one of cloud exchange points 528 or indirectly via one of network service providers 506A-506B (collectively, "NSPs 506," or alternatively, "carriers 506"). NSPs 506 provide "cloud transit" by maintaining a physical presence within one or more of cloud exchange points 528 and aggregating layer 3 access from one or customers 508. NSPs 506 may peer, at layer 3, directly with one or more cloud exchange points 528 and in so doing offer indirect layer 3 connectivity and peering to one or more customers 508 by which customers 508 may obtain cloud services from the cloud exchange 500.

Each of cloud exchange points 528, in the example of FIG. 5, may be assigned a different autonomous system number (ASN). For example, cloud exchange point 528A is assigned ASN 5, cloud exchange point 528B is assigned ASN 2, and so forth. Each cloud exchange point 528 is thus a next hop in a path vector routing protocol (e.g., BGP) path from API exchange 101 to customers 508. As a result, each cloud exchange point 528 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 550 to customers. In other words, cloud exchange points 528 may internalize the eBGP peering relationships that cloud service providers 550 and customers 508 would maintain on a pair-wise basis. Instead, a customer 508 may configure a single eBGP peering relationship with a cloud exchange point 528 and receive, via the cloud exchange, multiple cloud services from one or more cloud service providers 550. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol. Each of cloud exchange points 528 may represent an example instance of cloud exchange point 303.

As examples of the above, customer 508D is illustrated as having contracted with a cloud exchange provider for cloud exchange 500 to directly access layer 3 cloud services via cloud exchange points 528C, 528D. In this way, customer 508D receives redundant layer 3 connectivity to cloud service provider 550A, for instance. Customer 508C, in contrast, is illustrated as having contracted with the cloud exchange provider for cloud exchange 500 to directly access layer 3 cloud services via cloud exchange point 528C and also to have contracted with NSP 506B to access layer 3 cloud services via a transit network of the NSP 506B. Customer 508B is illustrated as having contracted with multiple NSPs 506A, 506B to have redundant cloud access to cloud exchange points 528A, 528B via respective transit networks of the NSPs 506A, 506B. The contracts described above are instantiated in network infrastructure of the cloud exchange points 528 by L3 peering configurations within switching devices of NSPs 506 and cloud exchange points 528 and L3 connections, e.g., layer 3 virtual circuits, established within cloud exchange points 528 to interconnect cloud service provider 550 networks to NSPs 506 networks and customer 508 networks, all having at least one port offering connectivity within one or more of the cloud exchange points 528.

As one example, customer 508A issues an API request 525 to an API exchange exposed by API exchange 101. NSP 506A transports the API request 525 to cloud exchange point 528A, which delivers the API request 525 to API exchange 101 using a virtual circuit between NSP 506A and API exchange 101.

API exchange 101 maps API exchange endpoints that are a destination of API request 525 to an API endpoint at customer 508D. API exchange 101 generates a new API request 525' that includes API data from the API request 525, and outputs the API request 525' to cloud network 508D. Cloud exchange point 528D delivers the service request 525' to cloud network 508D using a virtual circuit between API exchange 101 and cloud network 508D.

Figure 6:
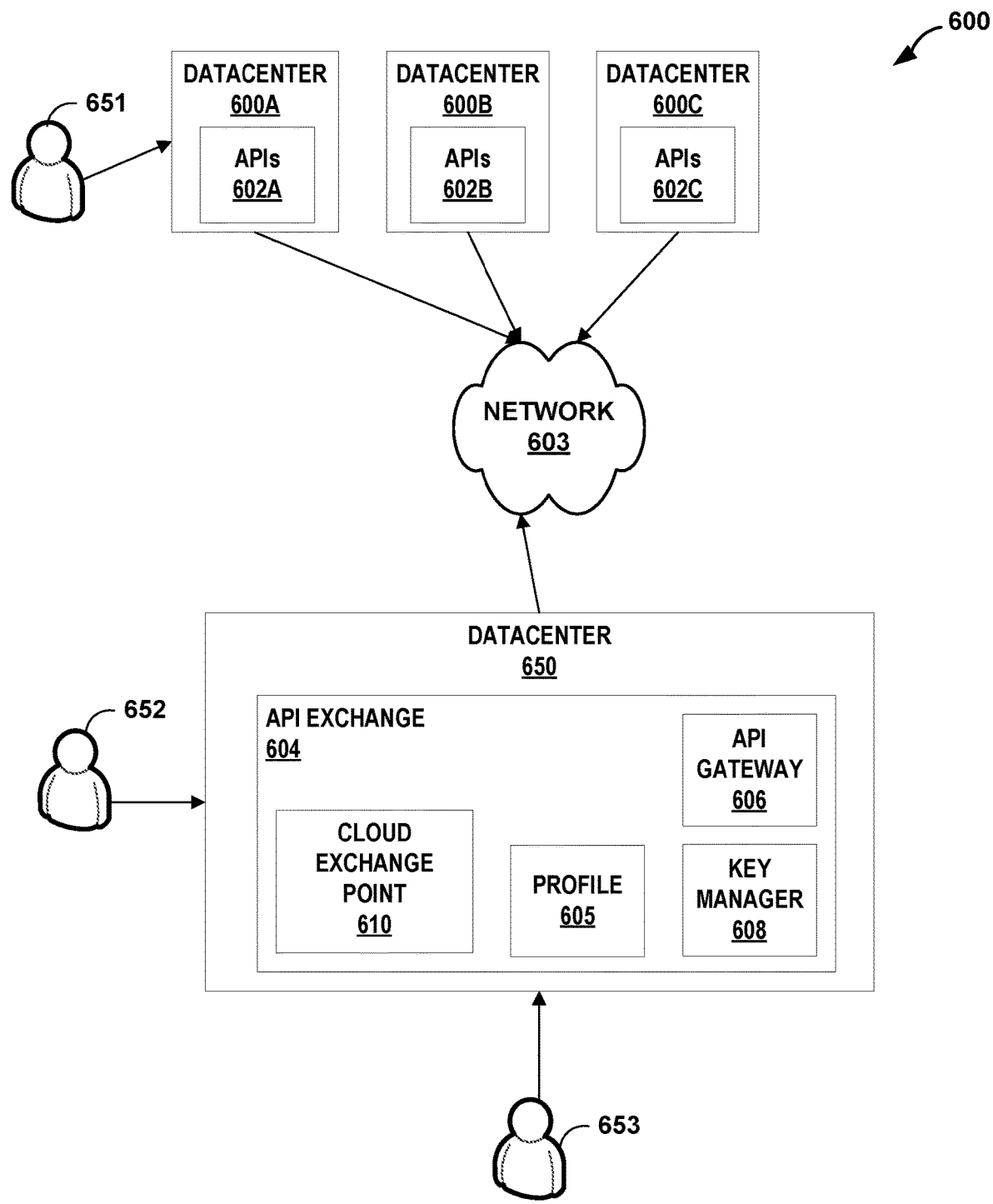
FIG. 6 is block diagram illustrating an example API exchange in accordance with the techniques of the disclosure.

FIG. 6 is block diagram illustrating an example API exchange in accordance with the techniques of the disclosure.

API provider 651 onboards a new router to connect APIs deployed in one or more of data centers 600A-600C (hereinafter, "data centers 600"). API provider 651 establishes network connectivity over network 603 (e.g., using a metro connect) connecting one or more of data centers 600 and data center 650, which hosts API exchange 604 including a cloud exchange point 610.

Service providers, such as cloud service providers (CSPs), may co-locate equipment within data centers 600A-600C managed by a data center provider. The service providers offer services to customer that interconnect to the co-located service provider networks. In some cases, the service providers deploy API gateways or other devices that expose such services via APIs 602A-602C. Each of APIs 602 may be associated with a different service provider. In some examples, one or more of APIs 602 are deployed by the data center provider. For example, API 602A may represent a Data Center Infrastructure Management (DCIM) API. Additional details regarding DCIM APIs are found in U.S. patent application Ser. No. 15/404,055, filed Jan. 11, 2017 and entitled "ASSOCIATING INFRASTRUCTURE ASSETS IN A DATA CENTER," the entire contents of which is hereby incorporated by reference in its entirety.

API exchange 604 includes an API gateway 606 that receives services requests from customers networks of customers 653, validates the services requests using subscription keys according to techniques described herein, and routes the service requests to APIs 602.

API exchange administrator 652 creates a service profile for service providers and onboards them as one API seller using a port of cloud exchange point 610.

API consumer 653 may create a virtual circuit (e.g., a VLAN) to access services on API exchange 604. API consumer 653 connects to APIs 602A-602C using an API bundling construct managed by API exchange 604 such that a single unique subscription key provided by API exchange 604 enables access to multiple APIs 602. In some examples, API consumer 653 accesses the APIs using a Layer 2 connection, such as a dedicated VLAN for an API bundle created by API exchange 604 for the API consumer 653.

In some examples, a single API consumer may request multiple different API bundles, each API bundle having a dedicated VLAN for the customer. By sending service requests on the correct VLAN for an API bundle, different domains for a customer may have segregated and differentiated access to different API bundles managed by API exchange 604.

In some examples, API exchange 604 provides connectivity to customer 653 via a Layer 2 VPN. In other examples, API exchange 604 provides connectivity to customer 653 via an Layer 3 VPN.

In the example where API exchange 604 provides a Layer 2 VPN to the customer, cloud exchange point 610 may implement an MPLS EVPN. Layer 2 VPN services (L2VPN) may connect a customer to a cloud service provider via a single bridged domain via a managed metro-based MPLS network without regard to the access network type. The L2VPN further supports wide-area Ethernet transport in accordance with network requirements of customer 653. In some examples, point-to-point Ethernet service is available over architecture provided by cloud exchange point 610. In some examples, multiple L2VPNs are available to customer 653 in accordance with cloud service provider service requirements. In some examples, system 600 may provide both built-in and operational redundancy in accordance with the requirements of the cloud service provider.

In the example where API exchange 604 provides a Layer 3 VPN to the customer, system 600 may provide IS-IS IGP routing as well as a LDP and MPLS transport infrastructure. These components provide a common switching layer enabling MPLS based services with high availability and fast convergence. MP-BGP (Multiprotocol BGP) is used as a control plane layer for the network services implemented on top of the MPLS transport infrastructure layer. MP-BGP is used as an information distribution protocol to distribute service information for Layer 2 (EVPN) and Layer 3 VPN instances.

RFC 4364 VPNs is also known as BGP/MIPLS VPNs because BGP is used to distribute VPN routing information across the provider's backbone, and MPLS is used to forward VPN traffic across the backbone to remote VPN sites. In some examples, cloud exchange point 60 may define multiple VRF instances for the same VPN based on service models described herein.

Figure 7A:
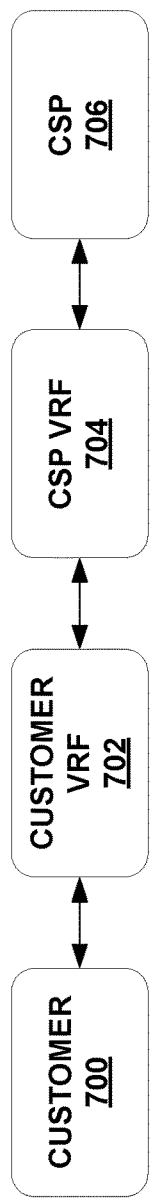
FIGS. 7A-7E are block diagrams illustrating example service models for an API exchange in accordance with the techniques of the disclosure.

FIGS. 7A-7E are block diagrams illustrating example service models for an API exchange in accordance with the techniques of the disclosure. For convenience, FIGS. 7A-7E are described with respect to FIG. 6. As depicted in FIG. 7A, to protect the control plane of cloud exchange point 610 and virtualize the network function to increase service agility, two logical service blocks are defined: Network function and Managed Service Function.

The Network function performs end-to-end Layer 3 transport and service access functions by terminating all external customer 700 and CSP 706 end points. Customer VRF 702 and CSP (Seller vs. Buyer) VRFs 704 are configured in a similar way, with additional information added to a CSP VRF 704 to allow customer subscription to the service. This model allows CSP 706 to also act as a customer for other CSPs. In the example of FIG. 7A, the API exchange gateway is offered as a service similar to a cloud service provider service.

Figure 7B:
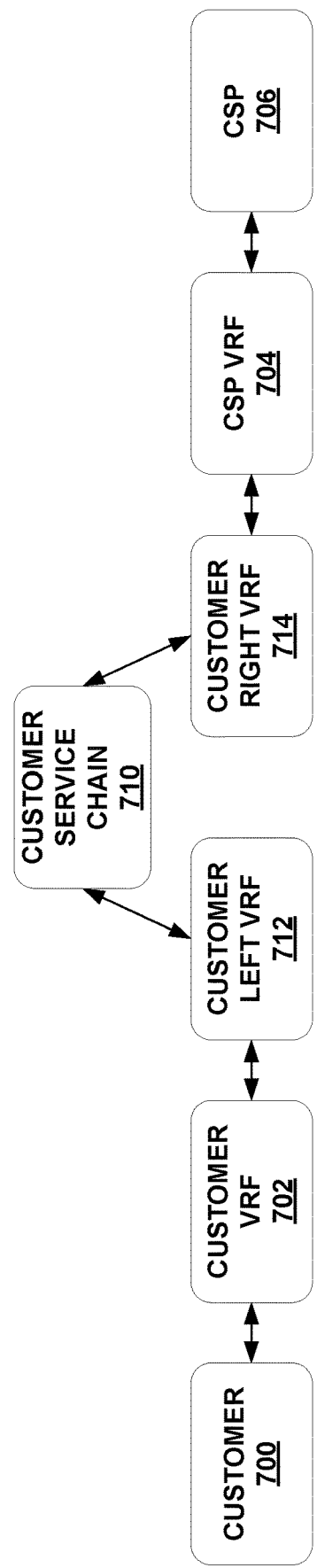

In the example of FIG. 7B, the Service function performs optional managed services, such as Firewall, NAT, or Server Load Balancing by logically transporting traffic between the Network Function VRFs through service chain 710 using an additional set of service VRFs: left VRF (LVRF) 712 and right VRF (RVRF) 714. LVRF 712 is used as a "Left" ingress point from Customer VRF instance 702 into service chain 710. RVRF 714 is used as a "Right" egress point out to CSP VRF instance 704 from service chain 710.

Figure 7C:
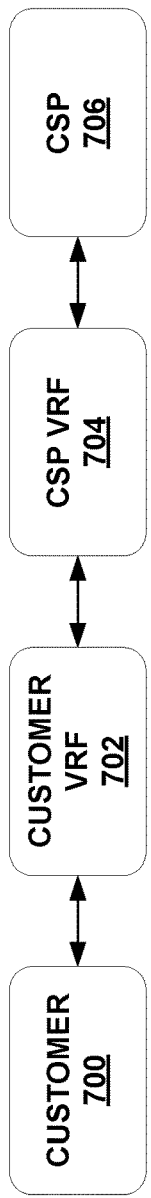

The example of FIG. 7C depicts the reverse direction wherein, from CSP 706 to customer 700, routes are learned from CSP 706 using an eBGP session. In other words, FIG. 7C depicts an example route propagation where there is no service chaining.

In some examples, CSP VRF 704 exports the routes using the following Route-Targets:

Export RT-CSP1-UP (ASN:20002) forms a hub-and-spoke relationship with customer VRF 7020 with CSP 706 as a hub.

Export RT-CSP1-VRF (ASN:10002) as part of an any-to-any VPN relationship within a CSP VPN. In some examples, this may be required for redundancy and fast convergence scenarios.

Customer VRF 702 imports the following Route-Targets:

Import RT-CSP1-UP (ASN:20002) to form a hub-and-spoke relationship with CSP VRF 704 with customer 700 as a spoke.

Import RT-Cust1-VRF (ASN:10001) as part of an any-to-any VPN relationship within a customer VPN. In some examples, this may be required for redundancy and fast convergence scenarios.

The routes learned on customer VRF 702 are advertised to customer 700 over the eBGP session.

Figure 7D:
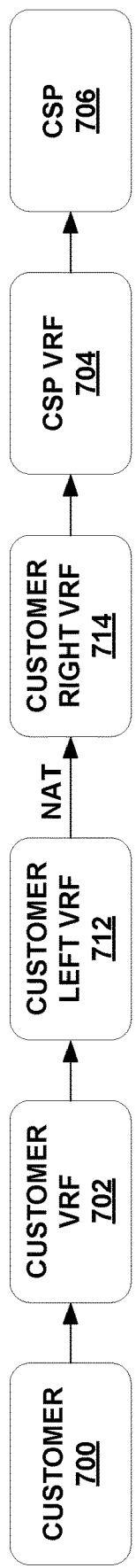

FIG. 7D depicts an example route propagation from customer 700 to CSP 706 that includes service chaining. In the example of FIG. 7D, the path includes a customer any-to-any VPN relationship with LVRF service VRF 712 to exchange all routes. Customer VRF 70 receives customer routes over eBGP and exports them using a standard customer VPN Route-Target (any-to-any model, RT-Cust1-VRF—ASN:10001). Customer LVRF 712 imports the customer routes using the same Route-Target (any-to-any model). This routing information enables Customer LVRF 712 to send traffic back to customer 700.

An iBGP session between LVRF 712 and RVRF 714 filters any updates in the left-to-right direction. In some examples, customer RVRF 714 has a dynamic route installed for any NAT pool configured on a NAT instance between LVRF 712 and RVRF 714, which appears as a static route. In other examples, if a different NAT solution is used, the different solution should identify a method to withdraw these customer routes in the event of a NAT resource failure.

The NAT pool route is exported to CSP VRF 704 using the RT-CSP1-DOWN (ASN:30002) Route-Target to form a spoke relationship with CSP VRF 704 as a hub instance. The NAT pool route is imported into CSP VRF 704 by importing RT-CSP1-DOWN (ASN:30002) and is advertised to CSP 706. In most cases, the eBGP policy advertises only an aggregate route for a complete NAT pool assigned to the site to reduce a BGP table size of CSP 706. In some examples, CSPs 706 requires discrete, per-customer NAT pools to be advertised.

In some examples, system 600 uses an IP pool that is unique per data center 600 (e.g., per metro area). In some examples, the IP pool is /24 subnet. In some example, the IP pool is used to assign IP blocks to be used on devices of cloud service point 610. In other examples, if customer 700 does not own a provider-independent public IP block, customer 700 may purchase an IP address block from cloud service point 610. In some examples, customer 700 purchases /29 blocks. In some examples where API exchange 604 advertises an aggregate route for a complete IP pool of a data center 600 to CSP 706, CSP 706 may not offer more than one RI for that data center 600.

Figure 7E:
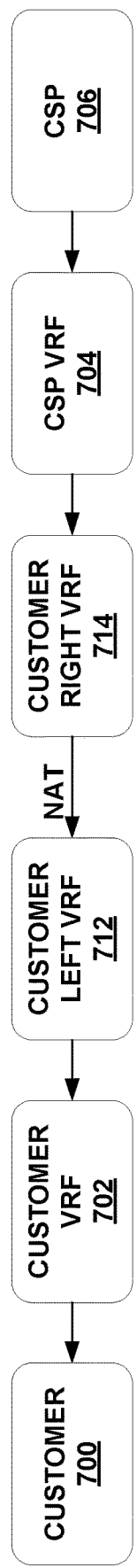

FIG. 7E depicts an example route propagation from CSP 706 to customer 700 that includes service chaining. In the example of FIG. 7E, the CSP routes are received over eBGP and are exported by using the following Route-Targets:

Export RT-CSP1-UP (ASN:20002) to form a hub-and-spoke relationship with customer RVRF 714, where CSP 706 is a hub.

Export RT-CSP1-VRF (ASN:10002) as part of an any-to-any VPN relationship within the CSP VPN. In some examples, this may be required for redundancy and fast convergence scenarios.

Customer RVRF instance 714 imports the RT-CSP1-UP (ASN:20002) Route-Target to form a spoke relationship with CSP VRF 704 as a hub. These routes are advertised through an iBGP session to Customer LVRF instance 712, and in turn exported using the RT-Cust1-VRF (ASN:10001) route-target, forming an any-to-any relationship with customer VRF instance 702. Customer VRF instance 702 imports routes from LVRF 712 by importing the RT-Cust1-VRF (ASN:10001) Route-Target, and advertises CSP routes to customer 700 over the eBGP session.

In some examples, the techniques of the disclosure may provide the following advantages:

API exchange administrator 652 for API exchange 600 may onboard a new router into data center 600 to connect to services offered by cloud exchange point 610 deployed in data center 650.

API exchange administrator 652 for API exchange 600 may create metro IP fabric 303 between data center 650 and cloud application routers deployed within data centers 600.

API exchange administrator 652 may create service profiles for feed data services and onboard the service profiles as APIs for purchase via a port of cloud exchange point 610.

Customer 653 may create a virtual circuit or VLAN for feed data services (e.g., both real-time and rest APIs) as a service provider.

Customer 653 may connect in real-time to APIs 602 provided by CSPs 706 using a unique subscription key.

Customer 653 may connect to APIs 602 from any data center 600 or 650.

Customer 653 may connect to APIs providing DCIM feed data for cloud exchange point 610 using a Layer 2 connection.

Customer 653 may use an Internet Exchange Point (IXP) to peer with cloud exchange point 610 as a peering provider.

Figure 8:
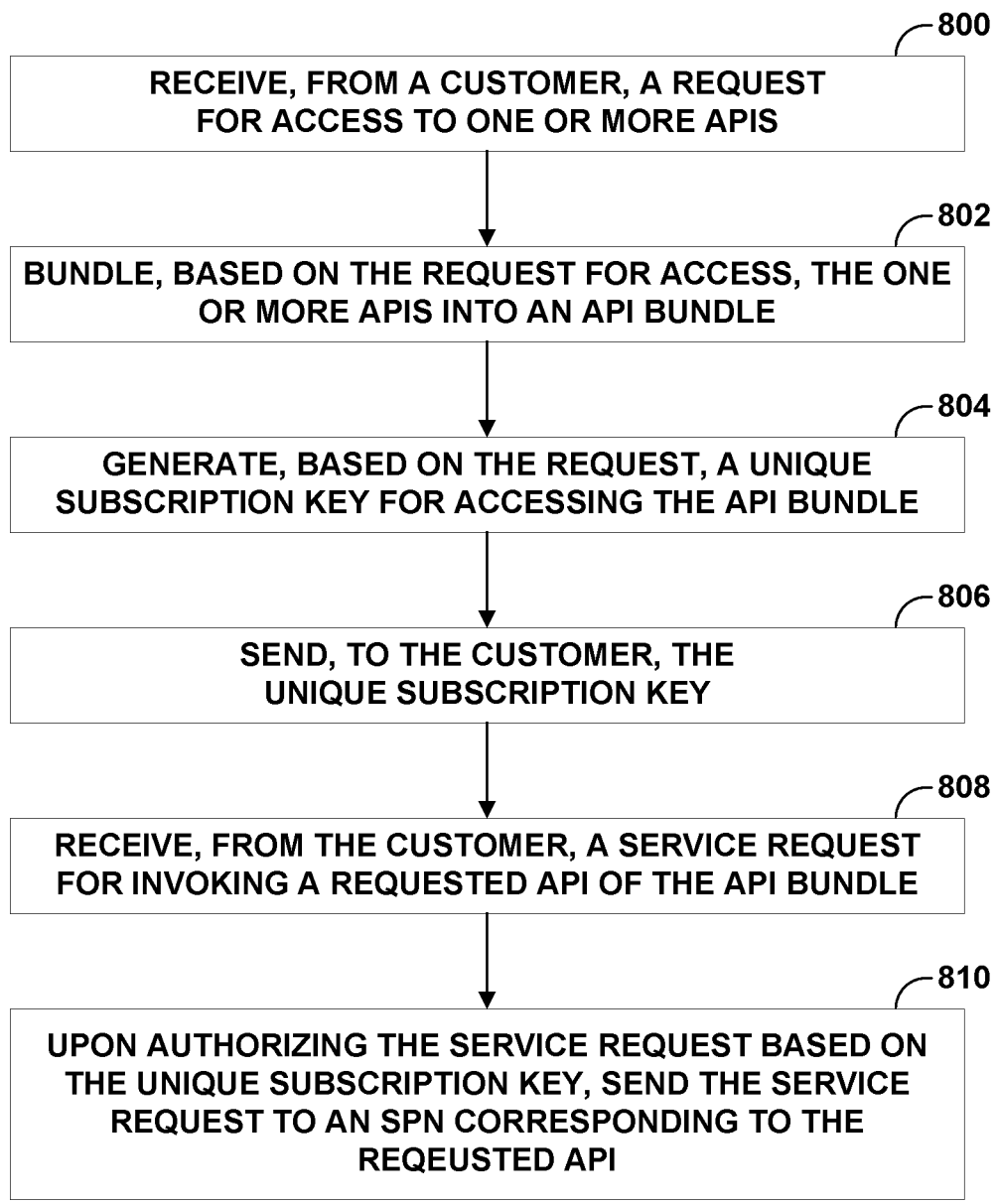
FIG. 8 is a flowchart illustrating an example mode of operation for an API exchange, according to techniques of this disclosure.

FIG. 8 is a flowchart illustrating an example operation for an API exchange, according to techniques of this disclosure. FIG. 8 is described for purposes of example with respect to system 600 of FIG. 6, but the operation may be performed by any API exchange described in this disclosure.

In the example of FIG. 8, API exchange 604 receives, from customer 653, a request for access to one or more APIs of a plurality of APIs 602 corresponding to respective service provider networks and to which API exchange 604 provides access (800). Based on the request for access, API exchange 604 bundles the one or more APIs into an API bundle 605 (802). Further, API exchange 604 generates, based on the request, a unique subscription key for accessing API bundle 605 (804).

In some examples, API exchange 604 generates a profile 605 for customer 653 that stores a list of the one or more APIs within API bundle 602A. The profile 605 further associates the unique subscription key with API bundle 602A. API exchange 604 sends the unique subscription key to the customer (806).

Subsequently, API exchange 604 receives, from customer 653, a service request for invoking a requested API of the one or more APIs of API bundle 602A (808). In some examples, the service request includes the unique subscription key for accessing API bundle 808. API exchange 604 authorizes customer 653 to access API bundle 602A based on the unique subscription key. In some examples, API exchange 604 authorizes customer 653 to access API bundle 602A by determining that the unique subscription key of the service request is associated with the list of the one or more APIs within API bundle 602A stored for the profile 605 of customer 653. API exchange 604 may determine the profile and the API bundle for the customer based on the dedicated customer VLAN on which the service request was received. Upon authorizing the service request to access the API bundle based on the unique subscription key, API exchange 604 sends the service request to a service provider network corresponding to the requested API (810).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    receiving, by an Application Programming Interface (API) exchange located within a data center and from a customer of the API exchange, a request for access, the request for access specifying two or more APIs of a plurality of APIs corresponding to respective service provider networks and to which the API exchange provides access, wherein each of the plurality of APIs is associated with a different corresponding API endpoint;
    generating, by the API exchange and based on the request for access specifying two or more APIs, a unique subscription key for accessing the two or more APIs specified by the request for access, wherein the unique subscription key enables access to any of the two or more APIs;
    storing, by the API exchange, to a profile for the customer, a list of the two or more APIs specified by the request for access and data indicative of an association between the unique subscription key and the list of the two or more APIs;
    sending, by the API exchange and to the customer in response to the request for access, the unique subscription key;
    receiving, by the API exchange and from the customer, a service request for invoking a requested API of the two or more APIs, the service request specifying the unique subscription key; and
    upon authorizing the service request to access the requested API based on the unique subscription key and the data indicative of the association, sending, by the API exchange, the service request to the service provider network corresponding to the requested API.

2. The method of claim 1, further comprising generating, by the API exchange, the profile for the customer,
    wherein authorizing the service request to access the requested API based on the unique subscription key and the data indicative of the association comprises determining that the unique subscription key of the service request is associated with the list of the two or more APIs stored in the profile for the customer.

3. The method of claim 1,
    wherein the service request further comprises user credentials for accessing the two or more APIs, and wherein authorizing the service request to access the requested API based on the unique subscription key and the data indicative of the association comprises authorizing the service request to access the requested API based on the user credentials.

4. The method of claim 1, further comprising, by the API exchange, logging into a server associated with the requested API.

5. The method of claim 1, further comprising:
creating, by the API exchange and in response to the request for access specifying two or more APIs, a virtual local area network (VLAN) with which the customer may access the two or more APIs using the unique subscription key,
wherein receiving the service request comprises receiving, by the API exchange, the service request via the VLAN.

6. The method of claim 5, wherein authorizing the service request to access the requested API based on the unique subscription key and the data indicative of the association comprises identifying the requested API based at least on the VLAN.

7. The method of claim 1, further comprising creating, by the API exchange, a record of service requests by the customer to the two or more APIs.

8. The method of claim 1, wherein each API of the two or more APIs comprises a data feed for a service of a plurality of services provided by a cloud-based services exchange point located within the data center.

9. An Application Programming Interface (API) exchange located within a data center, comprising:
a network; and
a computing system comprising one or more processors, wherein the computing system is configured to receive, from a customer of the API exchange and via the network, a request for access, the request for access specifying two or more APIs of a plurality of APIs corresponding to respective service provider networks and to which the API exchange provides access,
wherein each of the plurality of APIs is associated with a different corresponding API endpoint,
wherein the computing system is configured to generate, based on the request for access specifying two or more APIs, a unique subscription key for accessing the two or more APIs specified by the request for access, wherein the unique subscription key enables access to any of the two or more APIs,
wherein the computing system is configured to store, to a profile for the customer, a list of the two or more APIs specified by the request for access and data indicative of an association between the unique subscription key and the list of the two or more APIs,
wherein the computing system is configured to send, to the customer in response to the request for access, the unique subscription key,
wherein the computing system is configured to receive, from the customer, a service request for invoking a requested API of the two or more APIs, the service request specifying the unique subscription key, and
wherein the computing system is configured to, upon authorizing the service request to access the requested API based on the unique subscription key and the data indicative of the association, send the service request to the service provider network corresponding to the requested API.

10. The API exchange of claim 9, further comprising: the profile for the customer,
wherein, to authorize the service request to access the requested API based on the unique subscription key and the data indicative of the association, the computing system is configured to determine that the unique subscription key of the service request is associated with the list of the two or more APIs stored in the profile for the customer.

11. The API exchange of claim 9,
wherein the service request further comprises user credentials for accessing the two or more APIs, and
wherein, to authorize the service request to access the requested API based on the unique subscription key and the data indicative of the association, the computing system is further configured to authorize the service request to access the requested API based on the user credentials.

12. The API exchange of claim 9, wherein the computing system is further configured to log into a server associated with the requested API.

13. The API exchange of claim 9,
wherein the computing system is further configured to create, in response to the request for access specifying two or more APIs, a virtual local area network (VLAN) with which the customer may access the two or more APIs using the unique subscription key, and
wherein, to receive the service request, the computing system is further configured to receive the service request via the VLAN.

14. The API exchange of claim 13, wherein, to authorize the service request to access the requested API based on the unique subscription key and the data indicative of the association, the computing system is further configured to identify the requested API based at least on the VLAN.

15. The API exchange of claim 9, wherein the computing system is further configured to create a record of service requests by the customer to the two or more APIs.

16. The API exchange of claim 9, wherein each API of the two or more APIs comprises a data feed for a service of a plurality of services provided by a cloud-based services exchange point located within the data center.

17. A non-transitory, computer-readable medium comprising instructions, that, when executed, cause one or more processors of an Application Programming Interface (API) exchange to:
receive, from a customer of the API exchange, a request for access, the request for access specifying two or more APIs of a plurality of APIs corresponding to respective service provider networks and to which the API exchange provides access, wherein each of the plurality of APIs is associated with a different corresponding API endpoint;
generate, based on the request for access specifying two or more APIs, a unique subscription key for accessing the two or more APIs specified by the request for access, wherein the unique subscription key enables access to any of the two or more APIs;
store, to a profile for the customer, a list of the two or more APIs specified by the request for access and data indicative of an association between the unique subscription key and the list of the two or more APIs;
send, to the customer in response to the request for access, the unique subscription key;
receive, from the customer, a service request for invoking a requested API of the two or more APIs, the service request specifying the unique subscription key; and
upon authorizing the service request to access the requested API based on the unique subscription key and the data indicative of the association, send the service request to the service provider network corresponding to the requested API.

18. The computer-readable medium of claim 17, wherein the instructions further cause the one or more processors to generate the profile for the customer, and
wherein to authorize the service request to access the requested API based on the unique subscription key and the data indicative of the association comprises determining that the unique subscription key of the service request is associated with the list of the two or more APIs stored in the profile for the customer.

19. The computer-readable medium of claim 17,
wherein the service request further comprises user credentials for accessing the two or more APIs, and
wherein, to authorize the service request to access the requested API based on the unique subscription key and the data indicative of the association, the instructions further cause the one or more processors to authorize the service request to access the requested API based on the user credentials.

20. The computer-readable medium of claim 17,
wherein the instructions further cause the one or more processors to create, in response to the request for access specifying two or more APIs, a virtual local area network (VLAN) with which the customer may access the two or more APIs using the unique subscription key, and
wherein, to receive the service request, the instructions further cause the one or more processors to receive the service request via the VLAN.

\* \* \* \* \*